April 12, 1949. A. R. THOMPSON 2,467,278
MACHINE FOR PACKING STRING BEANS
Filed July 14, 1942 13 Sheets-Sheet 1
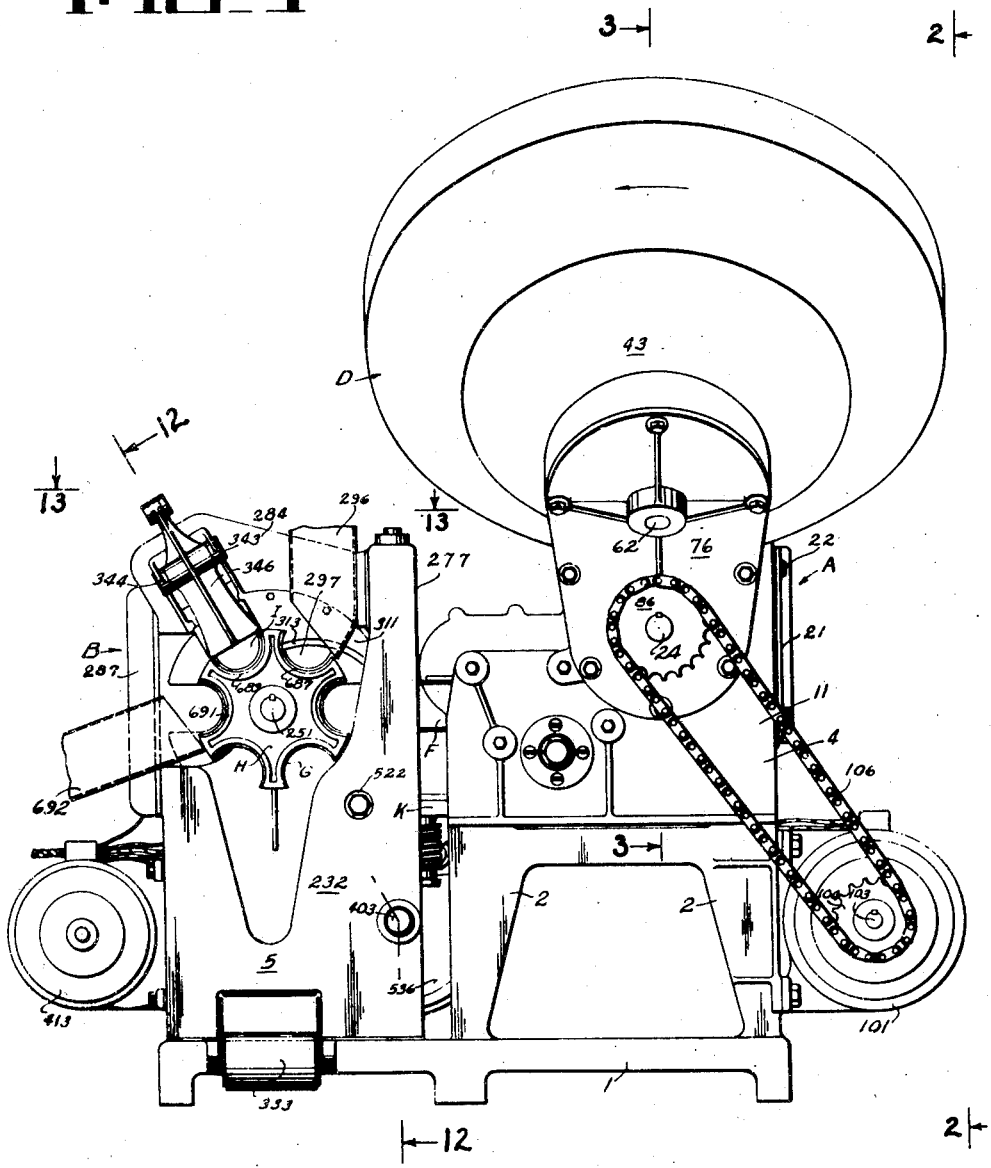
FIG_1
Inventor
ALBERT R. THOMPSON
By Philip A. Minnis
Attorney April 12, 1949.  A. R. THOMPSON  2,467,278
MACHINE FOR PACKING STRING BEANS
Filed July 14, 1942  13 Sheets-Sheet 2
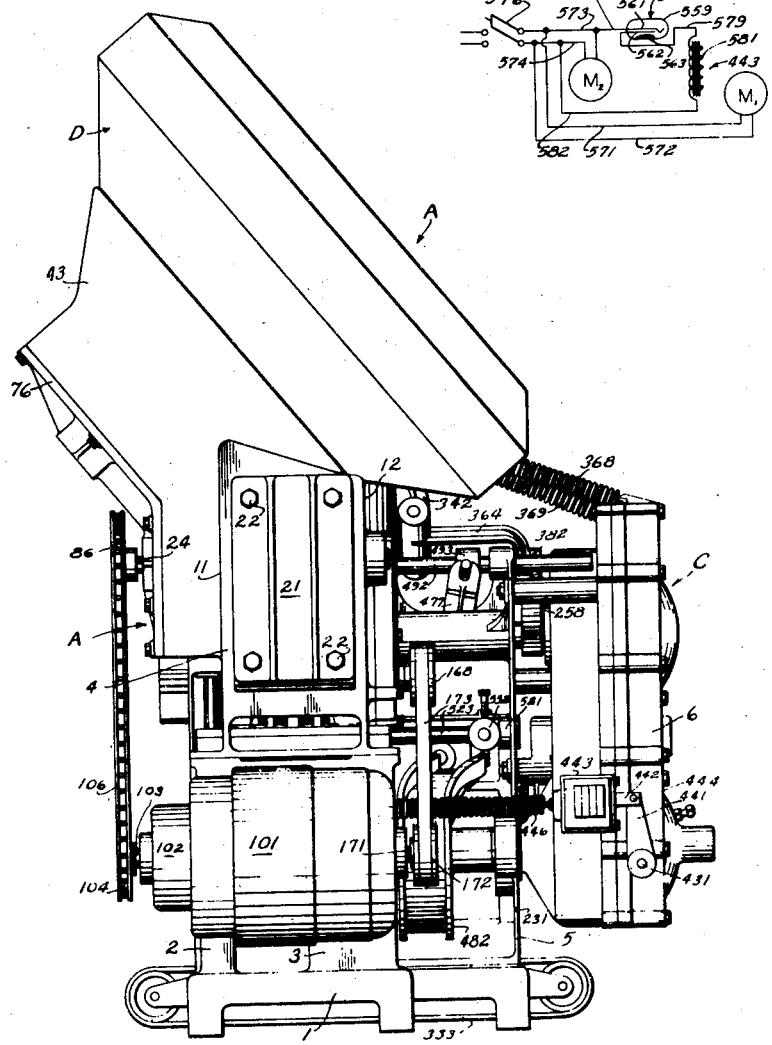
Inventor
ALBERT R. THOMPSON

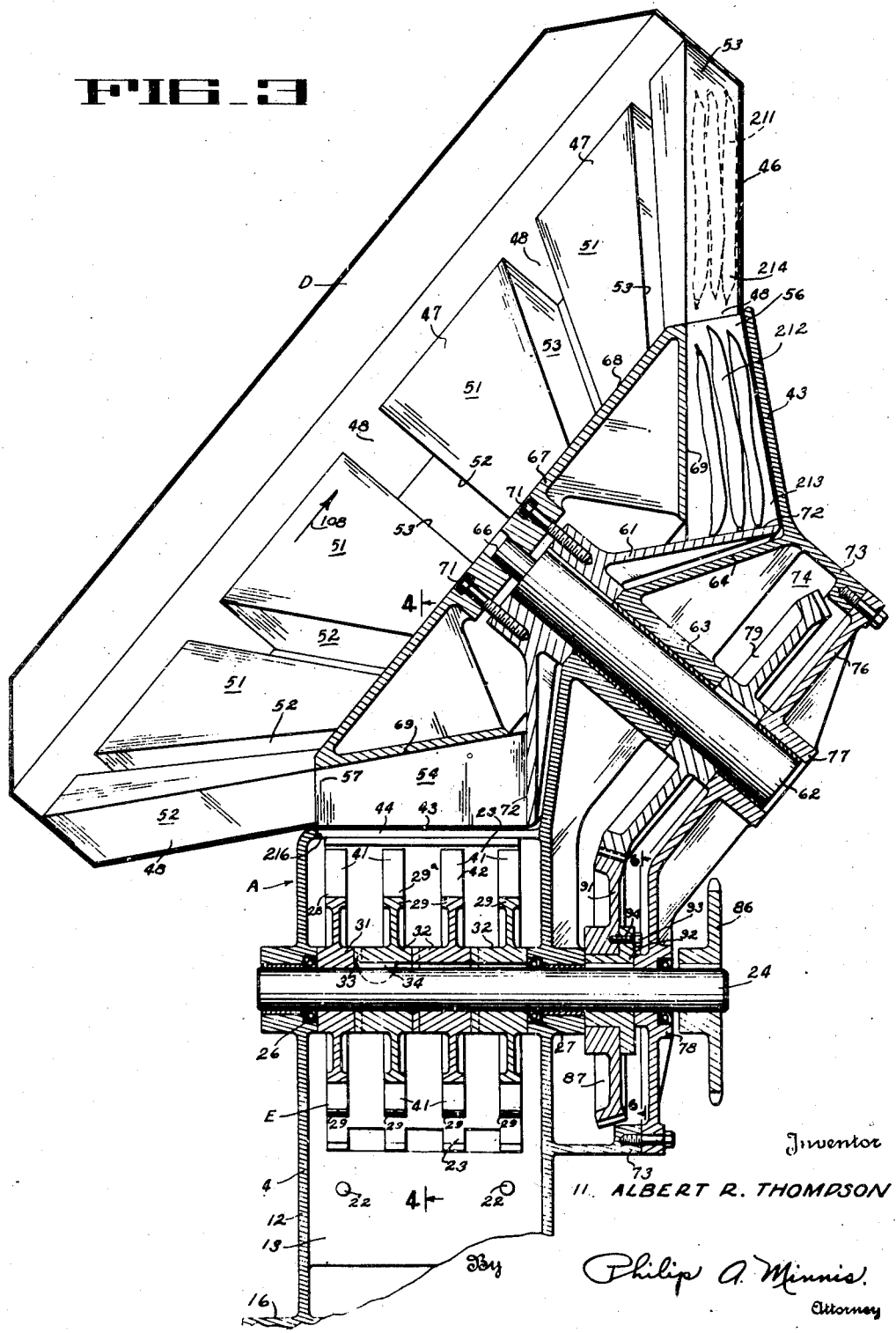

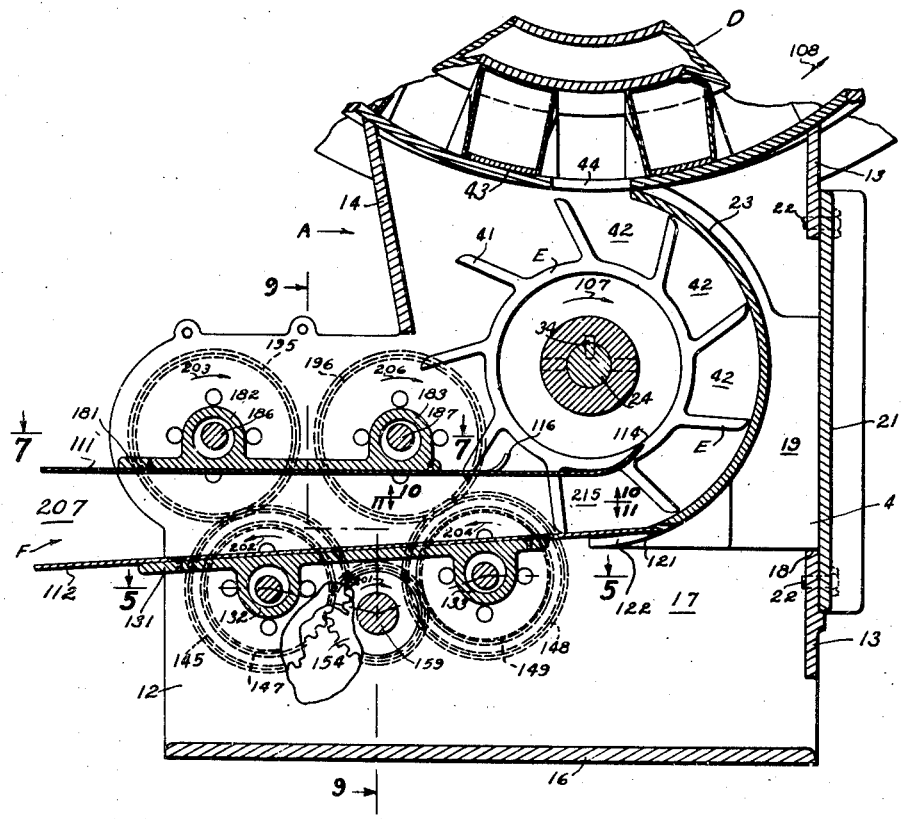
FIG_4
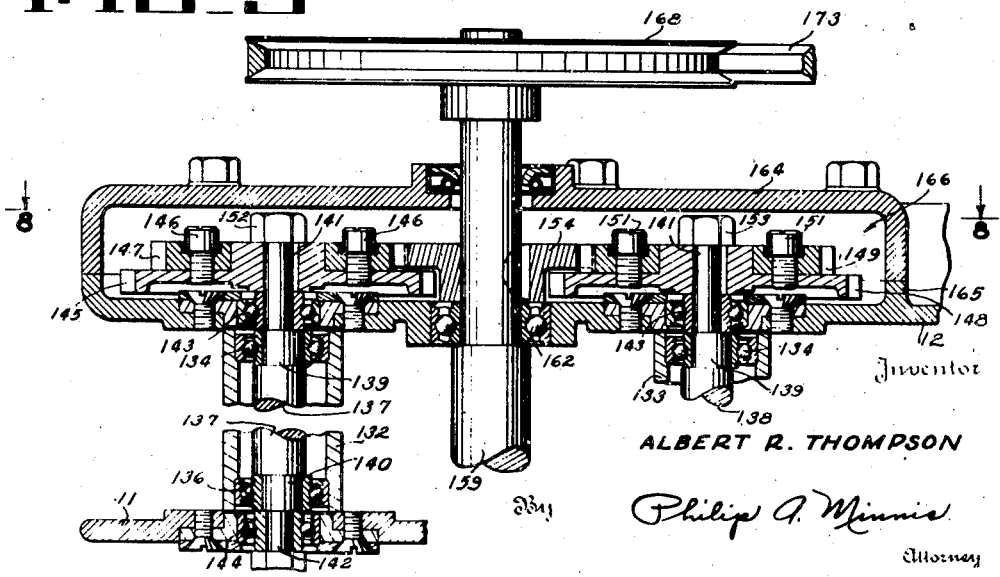
FIG_5
Inventor
ALBERT R. THOMPSON

April 12, 1949. A. R. THOMPSON 2,467,278
MACHINE FOR PACKING STRING BEANS
Filed July 14, 1942 13 Sheets-Sheet 5
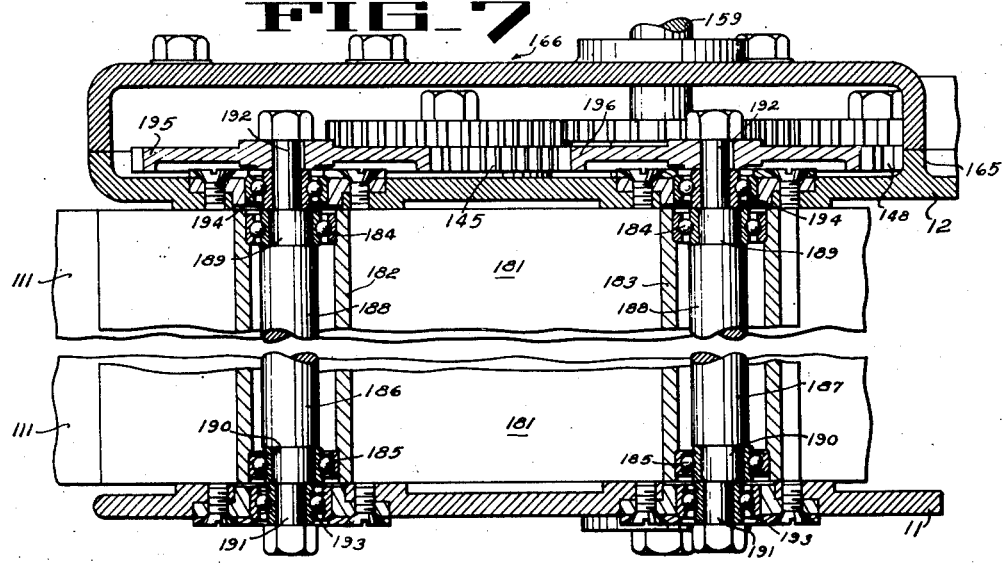
FIG_7
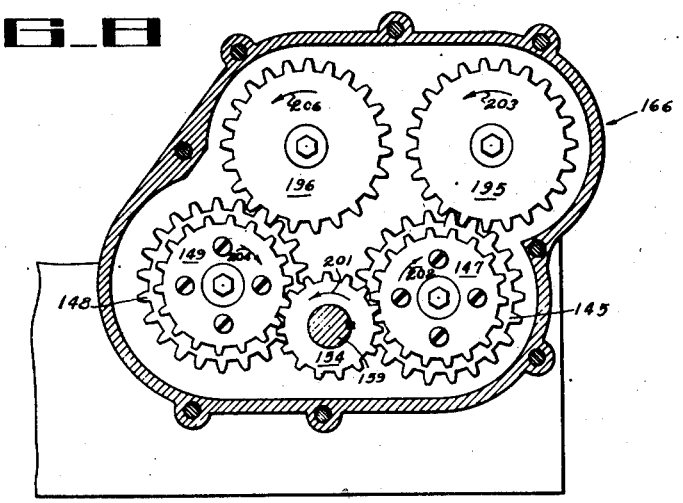
FIG_8
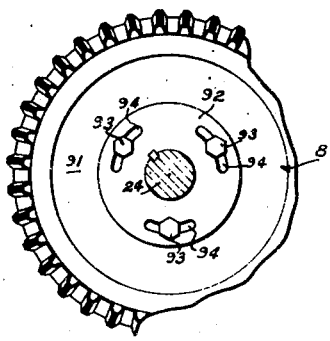
FIG_6
INVENTOR
ALBERT R. THOMPSON
BY
Philip G. Minnis

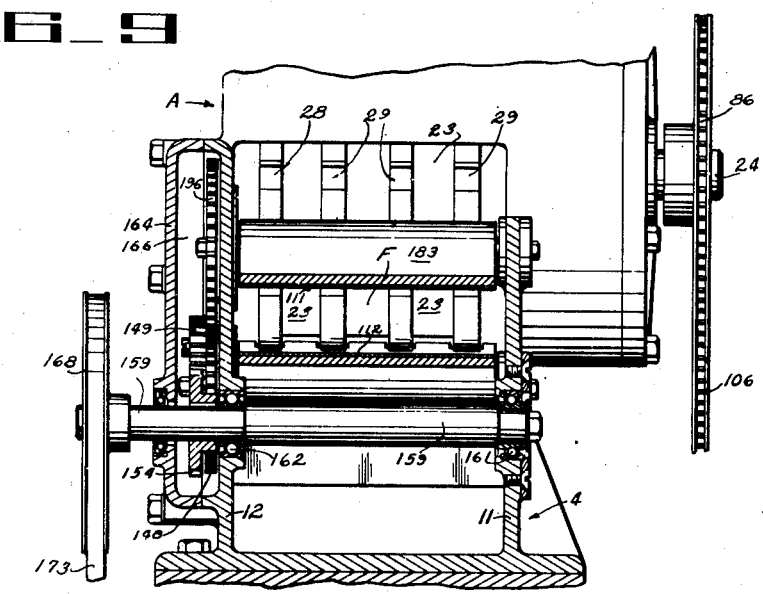
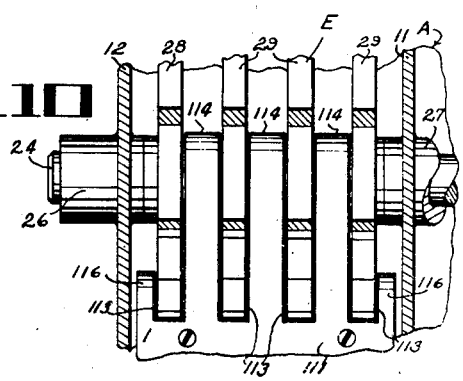
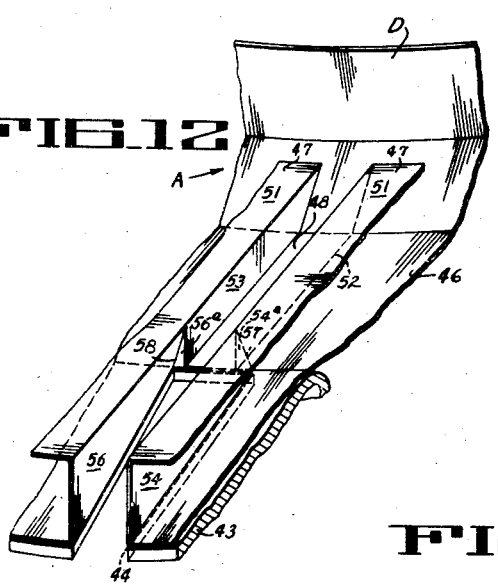
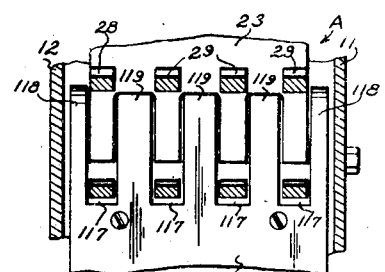

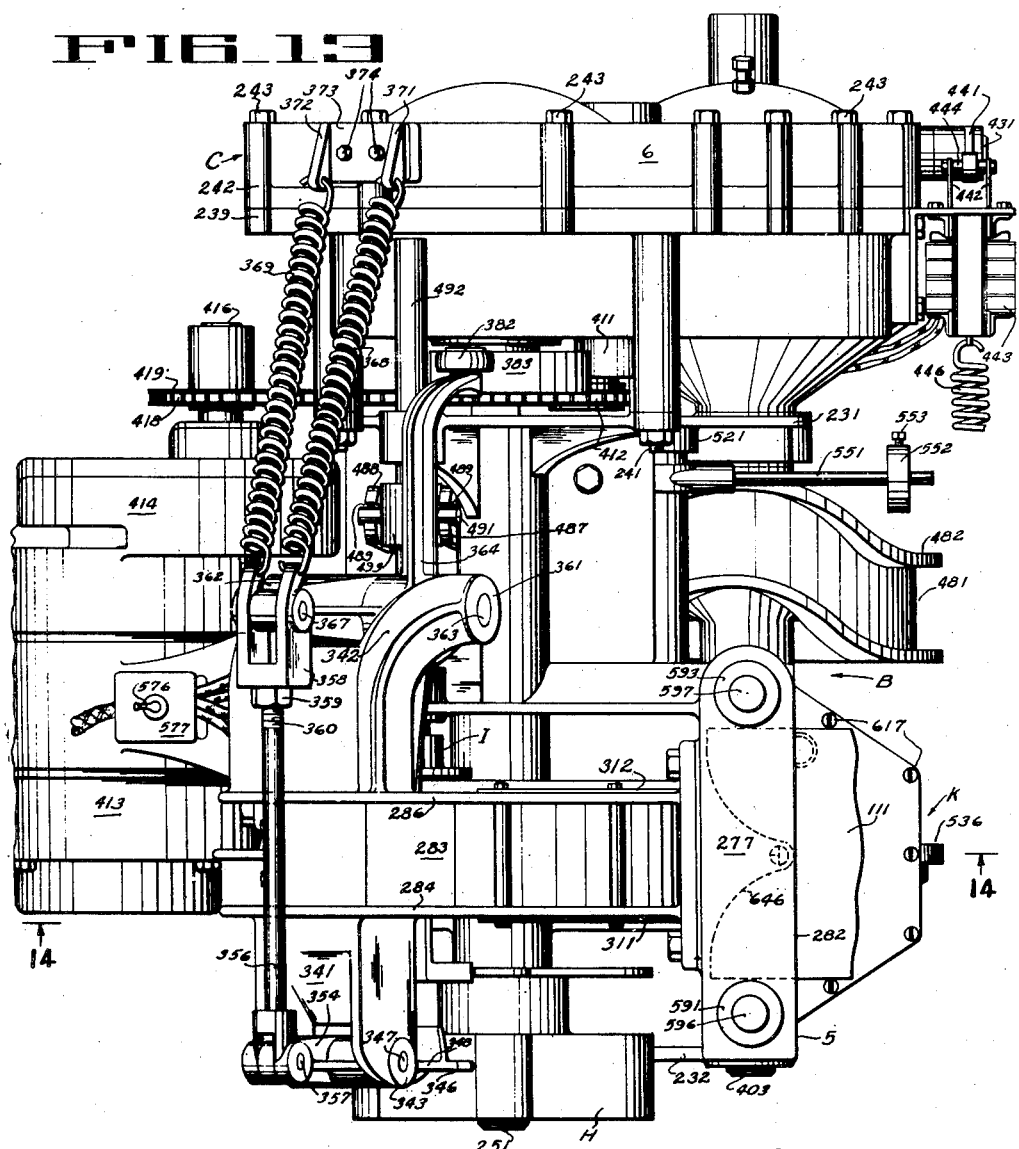

April 12, 1949.　　　A. R. THOMPSON　　　2,467,278
MACHINE FOR PACKING STRING BEANS
Filed July 14, 1942　　　　　　　　　　13 Sheets-Sheet 8
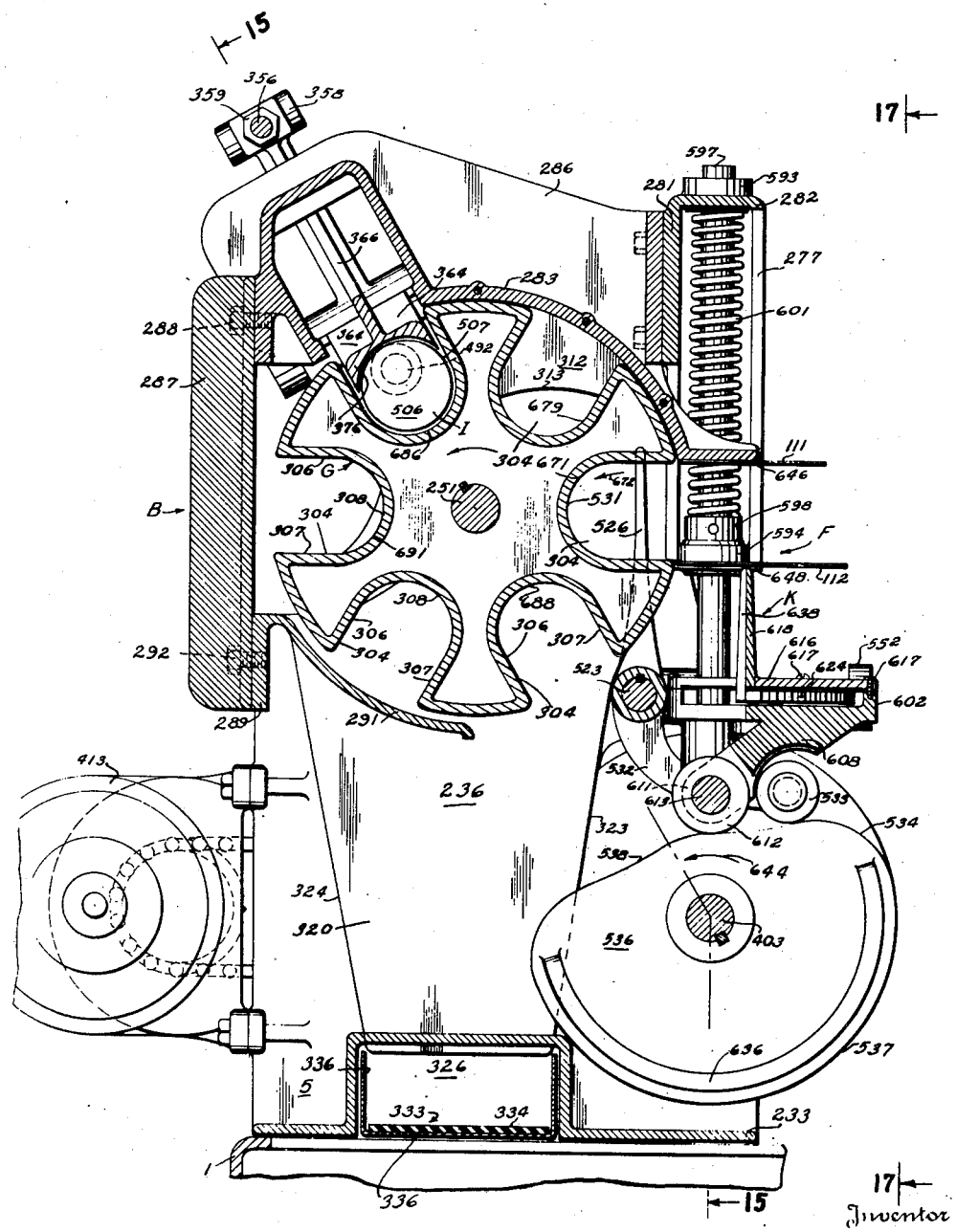
FIG_14
Inventor
ALBERT R. THOMPSON
By Philip P. Minnis
Attorney April 12, 1949.  A. R. THOMPSON  2,467,278
MACHINE FOR PACKING STRING BEANS
Filed July 14, 1942  13 Sheets-Sheet 9
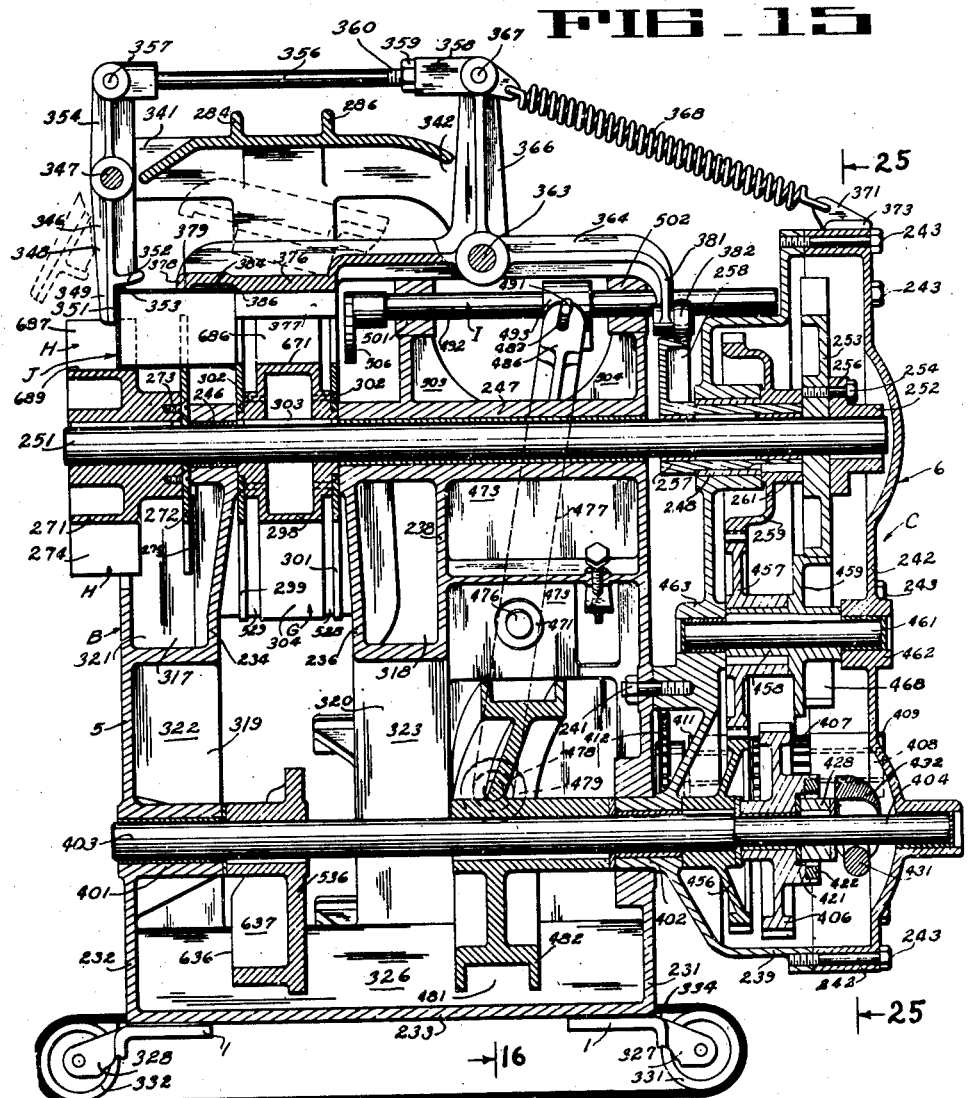
FIG_15
FIG_29
Inventor
ALBERT R. THOMPSON
By Philip A. Minnie
Attorney

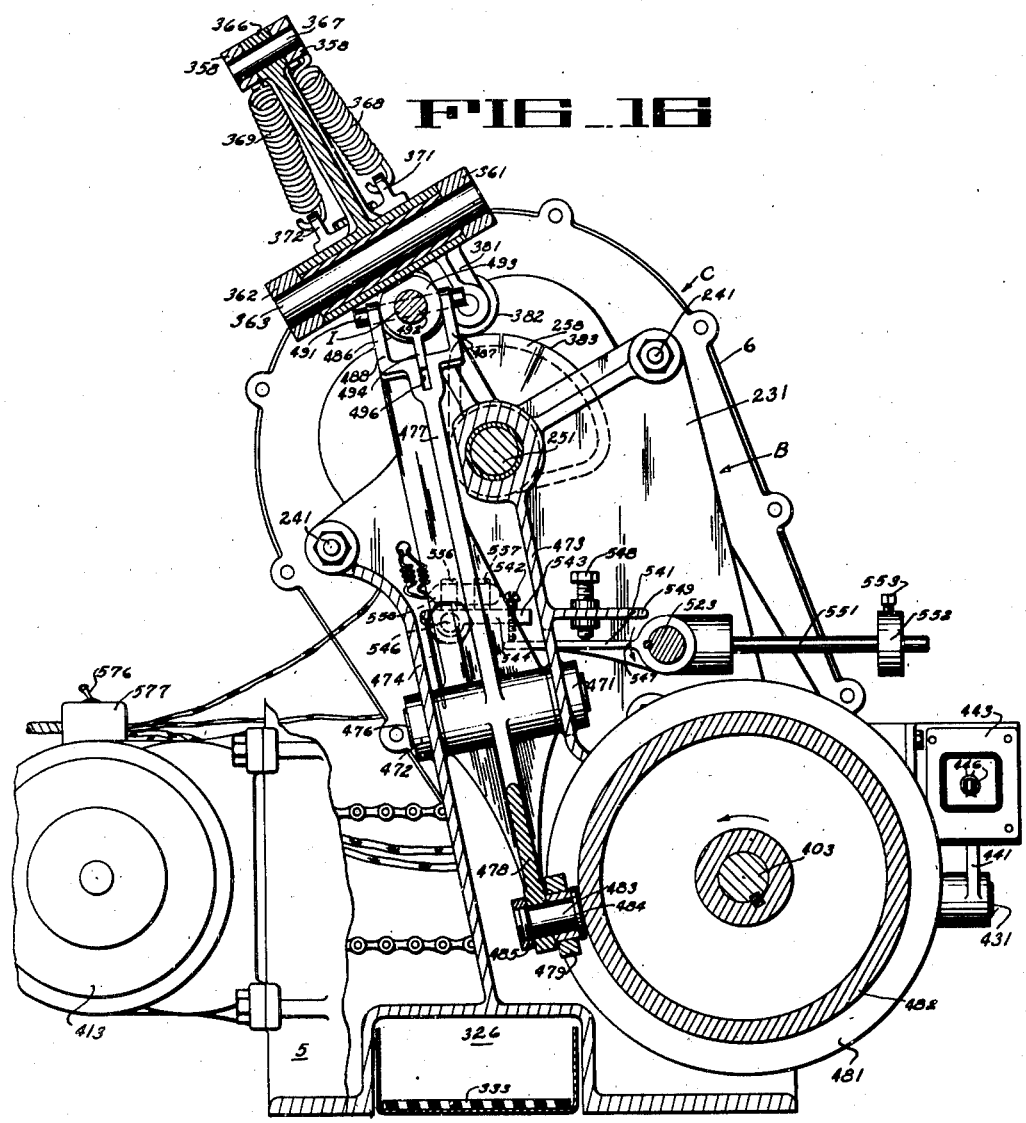
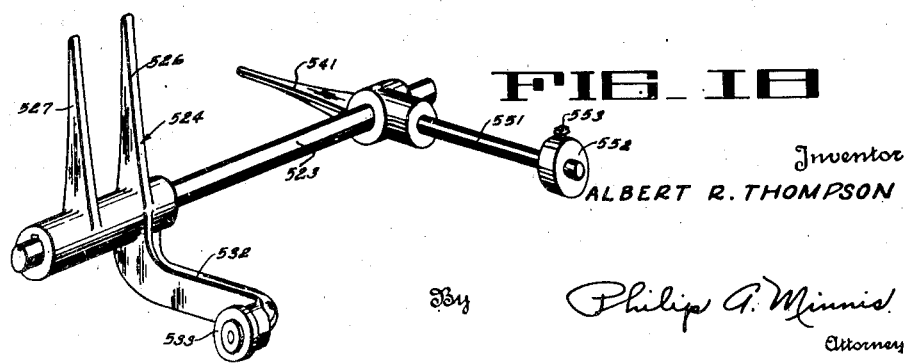

April 12, 1949.　　A. R. THOMPSON　　2,467,278
MACHINE FOR PACKING STRING BEANS
Filed July 14, 1942　　13 Sheets-Sheet 11
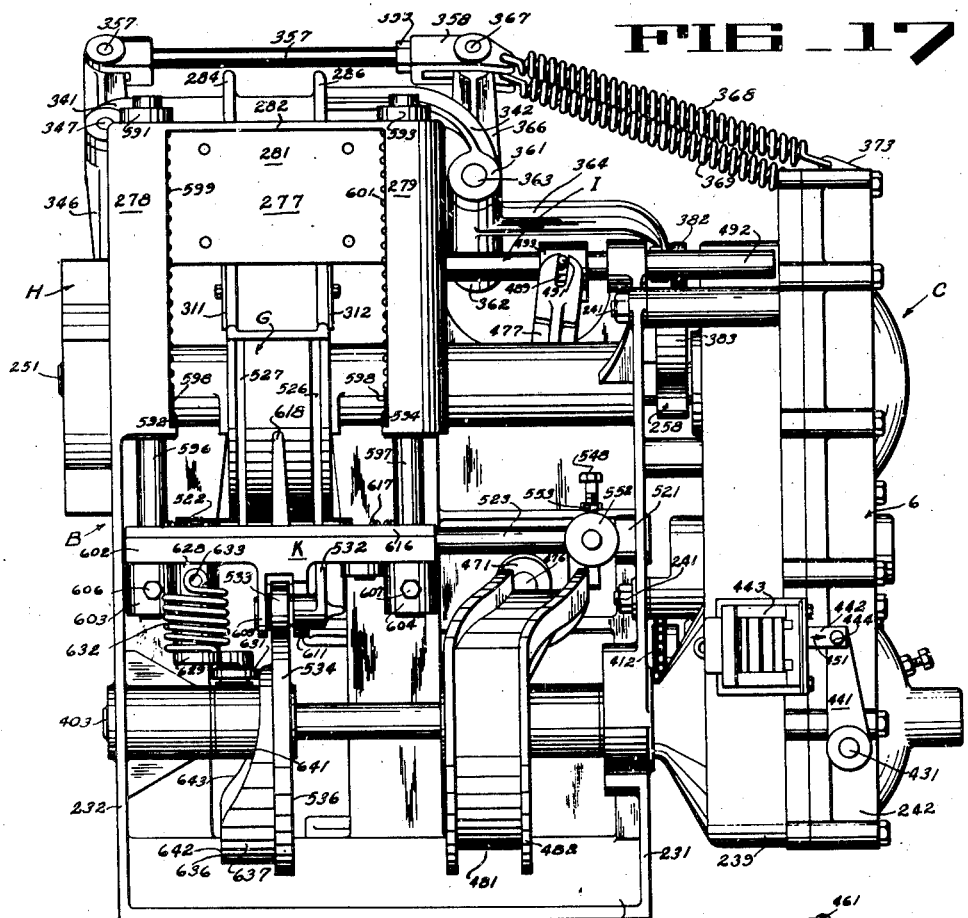
Inventor
ALBERT R. THOMPSON
By Philip A. Minnis
Attorney April 12, 1949.　　A. R. THOMPSON　　2,467,278
MACHINE FOR PACKING STRING BEANS
Filed July 14, 1942　　13 Sheets-Sheet 12
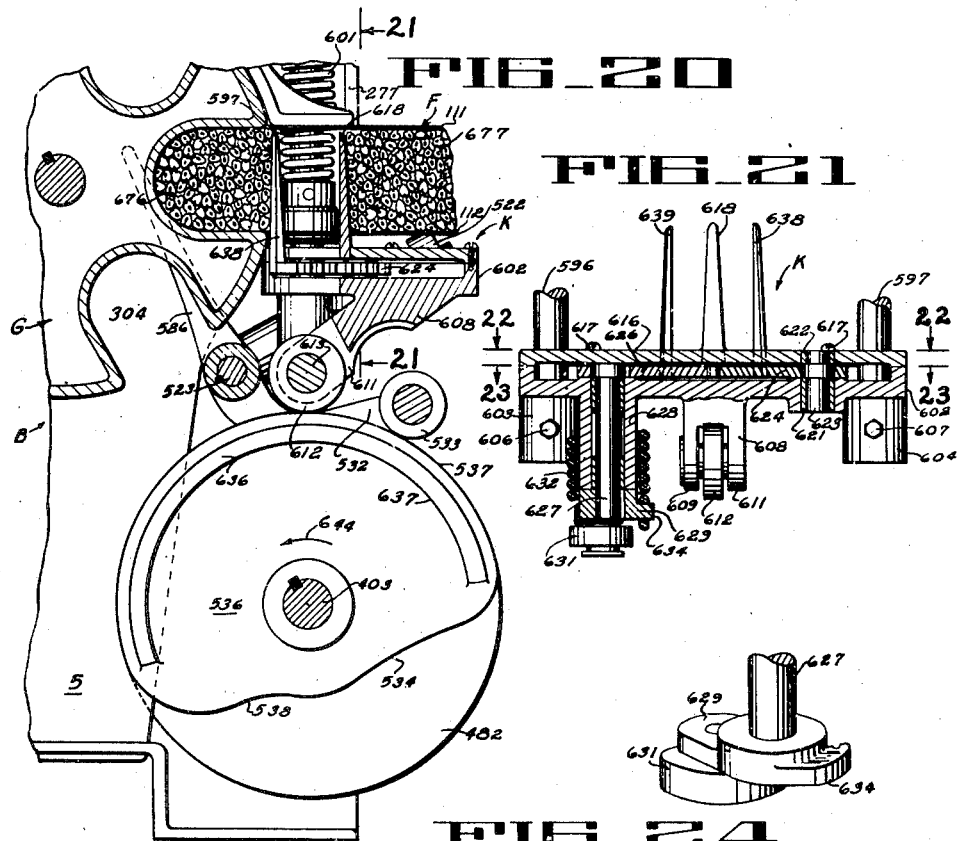
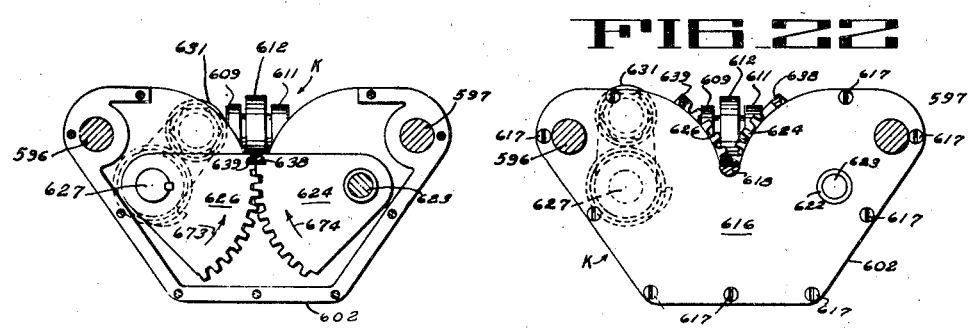
Inventor
ALBERT R. THOMPSON
By Philip A. Minnes
Attorney

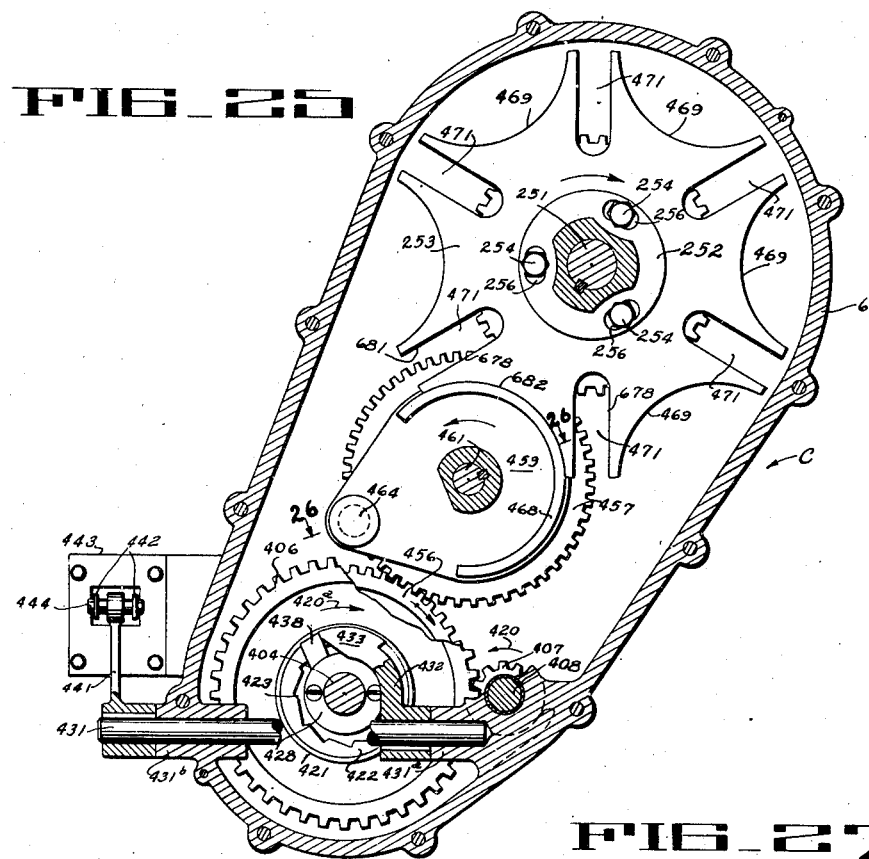
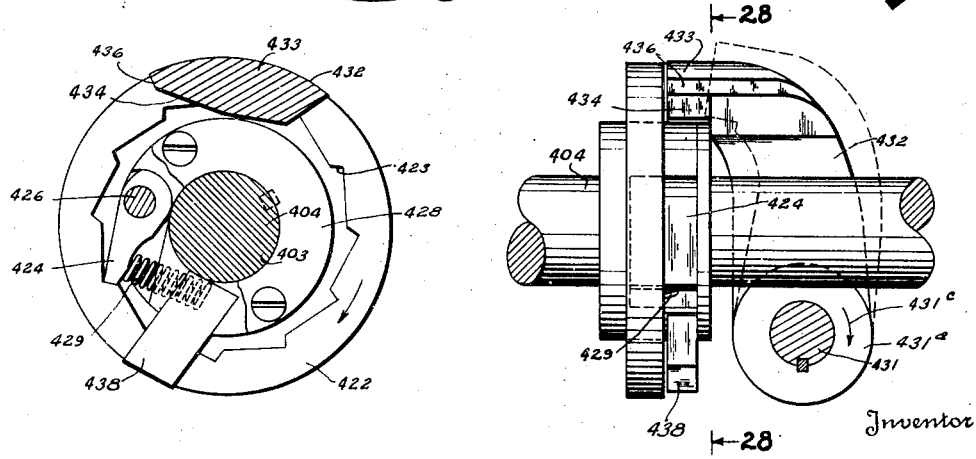
Inventor
ALBERT R. THOMPSON
By Philip A. Minnis
Attorney

Patented Apr. 12, 1949

2,467,278

UNITED STATES PATENT OFFICE 2,467,278

MACHINE FOR PACKING STRING BEANS

Albert R. Thompson, Los Gatos, Calif., assignor to Food Machinery and Chemical Corporation, San Jose, Calif., a corporation of Delaware Application July 14, 1942, Serial No. 450,938

31 Claims. (Cl. 226—19)

The present invention appertains to a machine for packing string beans into containers such as sanitary cans or the like.

An object of the present invention is to provide an automatic machine for packing string beans into containers in an efficient, speedy and sanitary manner.

Another object is to provide a machine for preparing string beans either for asparagus style pack or for vertical style pack, and for packing the prepared string beans into containers.

Another object is to provide a machine for arranging string beans in a predetermined position with respect to each other and for depositing the same in such position into containers.

Another object is to provide a machine for arranging string beans in predetermined position with respect to each other for cutting the individual string beans to substantially equal length and for packing the string beans into containers.

Another object is to provide a feed mechanism for arranging the individual pods of a promiscuous mass of string beans in substantially parallel relation and for maintaining the pods in such relation for subsequent packing thereof into containers such as sanitary cans or the like.

Another object is to provide a feed mechanism for string bean packing machines for receiving a promiscuous mass of string beans for arranging the individual pods of said mass in substantial parallel relation and for dividing the string beans into separate charges of substantially equal size and weight.

Another object is to provide a feed mechanism for string bean packing machines for arranging the individual pods of a promiscuous mass of string beans in substantially parallel relation and for crowding the same in such relation into a continuous stream of string beans.

Another object is to provide a bean dividing mechanism for dividing and unlacing a continuous stream of string beans into separate charges.

Another object is to provide a mechanism for dividing and unlacing a continuous stream of gently packed and substantially parallel string beans into separate charges of predetermined size.

Another object is to provide a bean turret for receiving a predetermined charge of string beans and for advancing the same into a predetermined position for packing into containers.

Another object is to provide a bean turret for receiving a predetermined charge of string beans and comprising means cooperating therewith for cutting each charge of string beans to substantially equal length.

Another object is to provide a bean turret, a feed mechanism for feeding the string beans thereto, and means for transferring string beans in separate charges from the feed mechanism to the bean turret.

Another object is to provide a bean turret, a feed mechanism for feeding string beans thereto arranged in substantially parallel relation with respect to each other including means cooperating with the bean turret and feed mechanism for dividing and unlacing the beans into separate charges and for transferring the same from the feed mechanism to the bean turret.

Another object is to provide a mechanism for assembling string beans in separate charges of substantially cylindrical configuration and for packing said charges into cans.

Another object is to provide a bean turret for receiving charges of string beans and provided with means for forming the charges into packages of substantially cylindrical configuration for subsequent packing into cans.

Another object is to provide a string bean packing machine for arranging the string beans in separate packages of predetermined diameter and length and for placing the packages of string beans into cans.

Another object is to provide a machine for arranging string beans in separate charges and for compressing the same into cylindrical configuration of a diameter slightly smaller than the inside diameter of the cans and for packing said charges into cans.

Another object is to provide a machine for packing string beans into cans wherein adjustable means are provided for controlling the quantity of string beans to be packed into each can.

Another object is to provide a machine for packing string beans into cans comprising adjustable means for controlling the tightness of pack of the string beans.

Other and further objects and advantages of the present invention will become apparent from the following description taken in connection with the accompanying drawings, in which:

Fig. 1 is a rear elevation of the string bean packing machine of the present invention.

Fig. 2 illustrates a side elevation of the string bean packing machine shown in Fig. 1.

Fig. 3 is a vertical section through a portion of the feed mechanism of the machine, taken along lines 3—3 of Fig. 1.

Fig. 4 is a vertical section of a portion of the feed mechanism shown in Fig. 3, taken along lines 4—4 thereof.

Fig. 5 is a horizontal section through the drive mechanism of the oscillating plates of the feed chute of the machine, the section being taken along lines 5—5 of Fig. 4.

Fig. 6 is a side view of the bevel gear and its associated parts employed in connection with the feed turret of the machine, certain portions being broken away.

Fig. 7 is a horizontal section taken along lines 7—7 of Fig. 4.

Fig. 8 is a section taken along lines 8—8 of Fig. 5.

Fig. 9 is a vertical section of a portion of Fig. 4, taken along lines 9—9 thereof.

Fig. 10 is a horizontal section of a portion of Fig. 4 taken along lines 10—10 thereof.

Fig. 11 is horizontal section of a portion of Fig. 4 taken along lines 11—11 thereof.

Fig. 12 is a perspective illustration of a portion of the feed hopper structure of the machine.

Fig. 13 illustrates a plan view of the packing or filling mechanism of the string bean packing machine, the view being taken along lines 13—13 of Fig. 1.

Fig. 14 is a vertical section through the bean packing mechanism, the section being taken along lines 14—14 of Fig. 13.

Fig. 15 illustrates a section of Fig. 14 taken along lines 15—15 thereof.

Fig. 16 is a vertical section taken along lines 16—16 of Fig. 15.

Fig. 17 shows a side elevation of the packing mechanism of the machine and the parts associated therewith, the view being taken along lines 17—17 of Fig. 14.

Fig. 18 is a perspective view of the pressure and switch control mechanism of the packing mechanism of the machine.

Fig. 19 illustrates a portion of Fig. 17 showing the bean dividing and unlacing mechanism in operative position.

Fig. 20 is an enlarged vertical section of Fig. 19 taken along line 20—20 thereof illustrating the operation of the pressure and switch control mechanism and the bean dividing and unlacing mechanism.

Fig. 21 shows a section through the bean dividing and unlacing mechanism taken along lines 21—21 of Fig. 20.

Fig. 22 illustrates a horizontal section through the bean dividing and unlacing mechanism taken along lines 22—22 of Fig. 21.

Fig. 23 shows a horizontal section of Fig. 21 taken along lines 23—23 thereof.

Fig. 24 is a perspective view of the cam roller and associated parts for controlling the opening and closing operation of the bean dividing and unlacing fingers.

Fig. 25 is a section through the drive mechanism of the bean and can turrets of the machine and certain control mechanisms associated therewith, the section being taken along lines 25—25 of Fig. 15, certain parts being broken away.

Fig. 26 is a reduced section through the Geneva driver taken along lines 26—26 of Fig. 25.

Fig. 27 shows an enlarged side elevation of the one-revolution clutch employed in connection with the drive mechanism illustrated in Fig. 25.

Fig. 28 is a section through the clutch mechanism shown in Fig. 27, taken along lines 28—28 thereof.

Fig. 29 is a reduced view illustrating a portion of the bean turret and one of the cutting knives cooperating with the same.

Fig. 30 is an enlarged section through the can rounding arm of the machine.

Fig. 31 is an enlarged section through the bean rounding arm of the machine.

Fig. 32 illustrates the wiring diagram of the machine.

General construction and operation of the machine

The string bean packing machine of the present invention, see Figs. 1, 2, 13 and 17, comprises a feed mechanism A, a packing mechanism B and a drive and control mechanism C for operating the packing mechanism and for controlling the function of the same.

The feed mechanism A consists of a feed hopper D, a feed turret E, and a feed chute F, while the packing mechanism B of the machine comprises a bean turret G, a can turret H and a plunger mechanism I. Interposed between the feed mechanism A and packing mechanism B and cooperating therewith is a bean dividing and unlacing mechanism K.

In the operation of the machine, the string beans are deposited in a promiscuous mass into the feed hopper D which functions to isolate small groups of string beans from said mass, to arrange the individual string beans of a group in substantial parallel relationship with respect to each other and to deposit them into the feed turret E. The feed turret E supplies the beans in substantially parallel relation to the feed chute F which is adapted to feed the string beans in a continuous stream to the bean turret G. The transfer of the beans from the feed chute F to the bean turret G is controlled by the bean dividing and unlacing mechanism K in such a manner that the string beans are supplied in separate charges of substantially predetermined size to the bean turret G. This turret G cooperates with means for preparing the string beans for asparagus style or vertical pack and advances the prepared charges of string beans into predetermined position with respect to the plunger mechanism I, which is thereupon operated to pack each charge of string beans into containers, such as sanitary cans or the like, which are carried by the can turret H in alignment with the charge of beans and advanced simultaneously therewith into alignment with the plunger mechanism I.

After the string beans have been packed into the cans, the cans are discharged from the machine and are subsequently closed and treated in any desired manner.

General frame structure of the machine

The frame structure of the machine of the present invention consists of a base 1, see Figs. 1 and 2, provided with upwardly extending frame portions 2 and 3 upon which a housing 4 supporting the feed mechanism of the machine is mounted in any convenient manner. Secured to the base 1, see Figs. 1 and 14 to 16 inclusive, is further a housing structure 5 within which the bean packing mechanism and its associated parts are arranged.

Secured to the housing structure 5 is a casing 6 within which certain parts of the drive and control mechanism of the machine are mounted. The specific structure of the housing 4, housing structure 5, as well as the casing 6 will be referred to later on in connection with the description of the feed and packing mechanism of the machine.

Feed mechanism

The feed mechanism A of the machine is carried by the housing 4 previously referred to and consists primarily of the hopper D, the feed turret E, and the feed chute F operatively associated with the turret E. The housing 4, see Figs. 3 and 4, comprises rear and front walls 11 and 12, side walls 13 and 14, and a bottom wall 16, forming a compartment 17. The end wall 13 is provided with an opening 18 through which a member 19 extends into the compartment 17.

The member 19 consists of a plate 21 which is secured to the outer wall 13 by means of cap screws 22 and the inner portion of the member 19 is formed into a semi-circular turret housing 23 within which the feed turret E is rotatably mounted by means of a shaft 24 rotatably arranged within bearings 26 and 27, see Fig. 3.

The turret E consists of a plurality of circular discs 28 and 29 spaced from each other equidistant by means of their hub portions 31 and 32, respectively. The hub portions of the discs 28 and 29 of the feed turret E are provided with interlocking claws 33 while one of the discs 29, designated 29a, is secured to the shaft 24 by means of a key 34 for rotation therewith. It will therefore be seen that upon rotation of the shaft 24 the disc 29a will be rotated therewith, causing a corresponding rotation of the remaining discs 29 as well as disc 28 due to the interlocking connection between the various discs above referred to. Each of the discs 28 and 29 of the feed turret A is provided with a plurality of fingers or vanes 41 extending in angular direction from the body portion of the discs so as to form bean receiving pockets 42 therebetween. The adjacent vanes of adjacent discs are positioned in alignment with respect to each other so that all pockets 42 are aligned with respect to each other, see Figs. 3, 4, 9 and 10.

The upper end of the compartment 17 is closed by an annular housing portion 43, forming an integral part of the housing 4 and provided with an elongated opening 44 extending parallel to the axis of the feed turret E. The length of the opening 44 exceeds the maximum length of the string beans to be handled by the machine. The feed turret E is so arranged with respect to the semi-circular turret housing 23 that the other ends of the vanes 41 are in proximity thereof and the pockets 42 are closed during their travel from the opening 44 to the feed chute F.

Mounted within and above the annular housing portion 43 previously referred to is the feed hopper D already previously mentioned herein. This feed hopper is of a somewhat conical configuration and consists of an annular hopper wall or housing 46 to which insert members 47 are welded in spaced relation so as to form a plurality of radially disposed inclined bean receiving slots or pockets 48 therebetween. Each of the insert members 47, see Figs. 3, 4 and 12, consists of an upper bean supporting surface 51 and upper side walls 52 and 53, as well as lower side walls 54 and 56. The insert members 47 are arranged in such a manner with respect to each other within the annular hopper housing 46 that the side walls 52 and 54 are adjacent the side walls 53 and 56 and form in conjunction with the hopper housing 46 the bean receiving pockets 48 previously referred to. The upper portions of these bean receiving pockets 48 are formed by opposing side walls 52 and 53 of the insert members 47. These side walls extend at right angles to the hopper housing 46 and form rectangular bean receiving pockets therewith.

The lower portions of the bean receiving pockets 48 are formed by the side walls 54 and 56 of opposing insert members 47 and diverge from each other toward the hopper housing 46 at 57 and 58, respectively. The greatest diversion of these side walls 57 and 58 from each other is adjacent the juncture with the side walls 52 and 53 which is established by means of triangular plates 54a and 56a welded between the side walls 52 and 54 as well as side walls 53 and 56, respectively. While the hopper housing 46 forms a bottom for the upper portions of the bean receiving pockets 48 intermediate the side walls 52 and 53 of the insert members 47, it should be noted that the hopper housing 46 is cut away at the bottom of the lower portion of the bean receiving pockets 48 intermediate the side walls 54 and 56, see Fig. 12. However, due to the fact that the lower portion of the hopper housing 46 extends into the annular housing portion 43, see Fig. 3, and is in close proximity thereof the annular housing portion 43 closes the bottom of the lower portion of the bean receiving pockets 48 for purposes as will be described later on.

The lower ends of the insert members 47 are supported and closed by a conical supporting member 61 keyed to a shaft 62 rotatably mounted within a hub portion 63 forming an integral part of a bottom wall 64 of the annular housing 43.

The upper end 66 of the shaft 62 is of reduced diameter, see Fig. 3, and slidably arranged upon the same is a conical clamping member 67 provided with an upper bean supporting surface 68 and a conical clamping surface 69 adapted to engage the upper surface 51 of the insert members 47. Clamp screws 71 freely rotatable within the conical clamping member 67 and threadably received within the hub portion of the conical supporting member 61 are provided for forcing the conical clamping member 67 into clamping engagement with the insert members 47 so as to force the lower ends 72 of the same into frictional engagement with the conical supporting member 61, whereby the hopper casing 46, the insert members 47, the conical supporting members 61 and the conical clamping member 68 are rigidly clamped together for rotation with the shaft 62 previously referred to.

The lower end of the annular housing portion 43 and the side of the housing 4 adjacent side wall 11 are provided with an extension wall 73 forming a gear housing 74 which is closed by a cover plate 76, see Fig. 3, provided with bearings 77 and 78. The bearing 77 receives the lower end of the shaft 62, and keyed to said shaft intermediate the bearing portions 63 and 77 is a bevel gear 79.

The rear end of the shaft 24 extends through bearing 78 and is rotatably supported therein. Keyed to the rear end of shaft 24 is a sprocket wheel 86, while interposed between the bearings 27 and 78 of the side wall 11 of the housing 4 and cover plate 76 is a bevel gear 87. This bevel gear is keyed to the shaft 24 for rotation therewith and intermeshes with the bevel gear 79 previously referred to.

The bevel gear 87 is preferably made of two parts 91 and 92 secured together by means of cap screws 93 which extend through arcuate slots 94 within the member 92, see Fig. 6, so that an adjustment is provided between the gears 79 and 87 as well as shafts 24 and 62 to permit an accurate alignment between the hopper D and the feed turret E which is necessary for a proper timed cooperation between the pockets 48 of the hopper D and the pockets 42 of the feed turret E.

Attached to one end of the upwardly extending frame portions 2 and 3 previously referred to herein is an electric motor 101 provided with a gear reduction box 102 and a slow speed drive shaft 103 to which a sprocket wheel 104 is keyed. Trained around the sprocket 104 and the sprocket wheel 86 keyed to shaft 24 previously referred to is a sprocket chain 106 so that upon operation of the motor 101 the shaft 24 and bean turret E are rotated in a direction as indicated by an arrow 107 in Fig. 4. Due to the intermeshing relation between bevel gears 87 and 79 the shaft 62 and the hopper structure D, i. e., the parts 46, 47, 67 and 61 thereof, are rotated in a corresponding direction, as indicated by arrows 108 in Figs. 3 and 4.

Mounted within the compartment 17 of the housing 4 of the feed mechanism of the machine are plates 111 and 112 extending longitudinally and transversely of the housing 4 and forming the feed chute F in conjunction therewith. The front end of the plate 111 is slotted, as shown at 113 in Fig. 10, so that a plurality of fingers or extensions 114 are formed thereby extending between the discs 28 and 29 of the feed turret E, the outermost extensions 116 of the plate 111 being considerably shorter than the extensions 114, see Figs. 4 and 10. The front ends of the extensions 114, as well as the extensions 116, are bent in upward directions, see Fig. 4.

The front end of the plate 112, see Fig. 11, is provided with slots 117 whereby extensions 118 and 119 are formed. The extensions 119 protrude into the spaces between the discs 28 and 29 of the feed turret E while the extensions 118 protrude into the spaces between the housing 4 and the outer discs 29 and 28 of the turret E. The front end of the extensions 118 and 119 are bent in downward directions as best seen at 121 in Fig. 4. The front end of the extensions 118 and 119 of the plate 112 are received within corresponding slots 122 of the semi-circular housing 23 of the feed turret E. The slots 113 and 117 of the plates 111 and 112 respectively are of such width and length as to permit a free rotation of the feed turret E without interfering with the vanes 41 of the same and permitting oscillating movement of these plates in a manner as will be described later on. Secured to the lower surface of the lower plate 112 is a supporting casting 131, provided with tubular transversely extending portions 132 and 133, within each of which a pair of ball bearings 134 and 136 are mounted. These ball bearings 134 and 136 are arranged adjacent the ends of the tubular supporting members 132 and 133, but only the ball bearing 134 of the tubular portion 133 is shown in Fig. 5 and it should be noted that the ball bearing 136 of the tubular portion 133 is of the same construction as ball bearing 136 of the tubular portion 132. Rotatably mounted within the ball bearings 134 and 136 are shafts 137 and 138, provided with eccentric portions 139 and 140 at their points of support within the bearings 134 and 136 respectively.

The shafts 137 and 138 are proivded with portions 141 and 142 of reduced diameter rotatably received within ball bearings 143 mounted within the side wall 12 and ball bearings 144 mounted within the side wall 11, respectively, of the housing 4. Only the reduced portion 142 and its associated bearing 144 of shaft 137 have been illustrated in Fig. 5 and it should be noted that the reduced portion 142 of shaft 138 and the bearing 144 cooperating therewith are of the same structure as illustrated in connection with the shaft 137. The reduced portions 141 of shafts 137 and 138 extend through the bearings 143, see Fig. 5. Keyed to portion 141 of shaft 137 is a gear 145 and secured to the same by means of cap screws 146 is a gear 147, while a gear 148 is keyed to the reduced end 141 of the shaft 138 and carries a gear 149 secured thereto by means of cap screws 151. Threadedly secured to the free end of shaft portions 141 of shafts 137 and 138 are nuts 152 and 153 respectively for maintaining the gears 145 and 148 in proper position on the shafts 137 and 138.

The gears 147 and 149 are of smaller diameter than the gears 145 and 148 and are adapted to mesh with a gear 154, keyed to a drive shaft 159 rotatably mounted within bearings 161 and 162 in the side walls 11 and 12, respectively, of the housing 4 of the machine, see Figs. 5 and 9. A cover 164 cooperating with a machined extension 165 of wall 12 of the housing 4 is provided to form a gear casing 166 within which the gears 145, 147, 148, 149 and 154 are enclosed. The shaft 159 extends through the side wall 12, bearing 162 and the cover 164 and is provided with a drive pulley 168 keyed thereto for rotation therewith.

The electric motor 101 previously referred to herein is also provided with a high speed shaft 171 to which a pulley 172 is keyed for rotation therewith, see Fig. 2. Trained around the pulleys 168 and 172 is a drive belt 173.

Secured to the upper surface of the plate 111, see Figs. 4 and 7, is a supporting casting 181 provided with tubular portions 182 and 183 extending transversely of the compartment 17 between the side walls 11 and 12 of the housing 4 of the machine. Rotatably mounted within the tubular portions 182 and 183 by means of ball bearings 184 and 185 are shafts 186 and 187. Each of these shafts 186 and 187 consists of a center portion 188 and eccentric portions 189 and 190 adjacent the same and positioned within the bearings 184 and 185 respectively, which in turn are mounted within the tubular portions 182 and 183. Each of the shafts 186 and 187 is further provided with concentric portions 191 and 192 of reduced diameter rotatably mounted within ball bearings 193 and 194, positioned within the side walls 11 and 12, respectively. The portion 192 of each shaft 186 and 187 extends through the bearing 194 into the gear casing 166. Keyed to the portion 192 of shaft 186 is a gear 195 while a gear 196 is keyed to the portion 192 of shaft 187. The gear 195 intermeshes with the gear 145 while the gear 196 intermeshes with the gear 148 previously referred to, see Fig. 8.

From the above, it will therefore be seen that upon operation of the motor 101 and rotation of the shaft 159, the gear 154 will be rotated in a direction as shown at 201 in Figs. 4 and 8, causing rotation of the gears 147 and 149 as well as gears 145, 195, 148 and 196, and shafts 137, 186, 138, 187 in directions as indicated by arrows 202, 203, 204 and 206, respectively, in Figs. 4 and 8.

Due to the eccentricity of the shaft portions 139, 140, 189 and 190 within the bearings of the tubular supporting members 182, 183, 132 and 133, the plates 111 and 112 are oscillated toward and away from each other upon rotation of shafts 137, 138, 186 and 187. During the movement of said plates toward each other they are also slightly advanced in the direction of the discharge end 207 of the feed chute F while during movement of the plates 111 and 112 away from each other, the same are retracted i. e., shifted toward the feed turret E.

Operation of feed mechanism

From the above description of the feed mechanism, it will therefore be apparent that upon operation of the electric motor 101, shafts 24 and 82 will be rotated causing a continuous rotation of the hopper D and feed turret E, in the directions indicated by arrows 107 and 108 in Figs. 3 and 4. Likewise, the operation of the motor 101 causes rotation of the shaft 159 whereby a continuous oscillation of the feed chute plates 111 and 112 is effected in a manner as previously described herein.

The string beans to be handled by the machine of the present invention are deposited in a promiscuous mass into the continuously rotating hopper D and due to the inclined position of the hopper D the mass of beans remains within the lower portion of the same.

While the hopper D is rotating at a predetermined speed, the mass of string beans is somewhat agitated and individual pods disposed parallel to the bean receiving pockets 48 of the hopper D fall into these pockets and are elevated thereby to a position as shown in dotted lines at 211 in Fig. 3, at which time the bean receiving pockets 48 are in a vertical position so that the pods slide from the upper portion of the bean receiving pockets 48 into the lower portion thereof and occupy a position as shown in full lines at 212 in Fig. 3, in which the lower ends of the beans rest upon the conical member 61. Due to the diversion of the side wall portions 54 and 56 and their increasing height toward the lower ends 72 of the same, the width and depth of the lower portion 213 of the bean receiving pockets 48 are considerably larger than that of the upper portions of said pockets. A free discharge of the string beans from the upper pocket portions into the lower pocket portions 213 is therefore assured, when the bean receiving pockets 48 assume a vertical position, as shown at 214 in Fig. 3. Furthermore, due to the increasing width and depth of the lower portion 213 of the bean receiving pockets 48, any possibility of wedging of the string beans within the pockets 48 which would impair the transfer of the string beans from the upper portion 214 to the lower portion 213 of the pockets 48 is eliminated.

After the string beans have been received within the lower portion 213 of the bean receiving pockets 48 as shown at 212 in Fig. 3, the same are advanced toward the discharge opening 44 of the housing portion 43 during further rotation of the hopper D. As soon as the lower portion 213 of the bean receiving pockets 48 is in registration with the opening 44, the string beans are discharged from the pockets 48 and fall into the pockets 42, see Figs. 3 and 4, of the feed turret E, which at this moment is in alignment with the discharge opening 44 to receive a charge of beans therefrom. During the discharge of the beans from the pockets 48 into the pockets 42 of the feed turret E, the individual string beans or pods remain in substantially the same parallel relation in which they were arranged by action of the hopper D.

The bean receiving pockets 48 of the hopper D are preferably of such size that only a few string beans are received therein and the pockets 42 of the feed turret E are of sufficient size to handle the quantity of beans received from the hopper D.

After the beans have been deposited into the pockets 42 of the feed turret E in the manner above described, they are advanced toward the inlet end 215 of the feed chute F, see Fig. 4, and are deposited therein while the vanes 41 of the feed turret E recede through the slots 113 in the upper plate 111.

Due to the inclination of the vanes 41 of the feed turret E at a predetermined angle in a direction opposite to the direction of rotation of the feed turret E, the beans are discharged from the pockets 42 of the feed turret E and are gently shifted into the mouth 215 of the feed chute F while any pinching or cutting of the beans between the vanes 41 and plates 111 is prevented.

From the above, it will therefore be seen that due to the action of the hopper D, the string beans are arranged substantially parallel with respect to each other in the pockets 48 with one of their ends engaging the conical member 61, and are thereupon discharged from the pockets 48 through the opening 44 into the pocket 48 of the feed turret E, which advances the beans to the feed chute F and deposits the same therein. The alignment of one of the ends of the string beans within the pocket 48 by the conical member 61 is important because otherwise a free discharge of the string beans through the opening 44 into the pockets of the feed turret E would be impossible. If the beans are not properly aligned in the manner above described, the other ends thereof opposite the conical member 61 might protrude beyond the edge 216 of the opening 44 and this would not only prevent a proper discharge of the string beans into the pockets 42 of the feed turret E but would cause a crushing or cracking of the string beans between the hopper D, housing portion 43 and feed turret E.

In this manner the string beans are continuously supplied and crowded into the feed chute F in succeeding charges so that the feed chute F will be filled with string beans which are advanced from the feed end toward the discharge end of that chute due to the oscillating action of the plates 111 and 112. It has been already mentioned in the above that the oscillating movement of the plates 111 and 112 is such that they move toward each other during their forward movement, i. e., during their movement toward the discharge end 207 of the feed chute F, so that not only a forward movement of the mass of string beans deposited therein is effected but also a slight compacting of the mass of beans is caused therein. The amount of compression of the string beans within the feed chute F depends upon the amount of beans supplied to the feed chute F by the feed turret E and should be such that only sufficient pressure is developed upon the beans within the feed chute F to pack the string beans sufficiently tight against each other to prevent the existence of undesirable voids between the same.

After the string beans have been arranged in the feed chute F in the manner above referred to, the same are fed thereby to the packing mechanism B of the machine, which will now be described.

Packing and control mechanism

The packing mechanism B of the machine of the present invention is mounted within the housing 5 of the machine while the control mechanism C is arranged within the gear casing 6 previously referred to. Both of these mechanisms are closely associated with each other and their cooperation is of such inter-dependent nature that a combined description of their construction and operation appears to be necessary to clearly bring out the functions of the same.

The housing 5 of the packing mechanism B, see Figs. 1, 13, 14, 15 and 16, comprises side walls 231 and a rear wall 232, a bottom wall 233, and a plurality of partition walls 234, 236 and 238 interposed between the side walls 231 and 232 and extending substantially parallel to the same, dividing the housing 5 into a plurality of compartments. Secured to the side wall 231 of the housing 5 is the gear casing 6, see Figs. 2, 13 and 15, within which the control mechanism C previously referred to is arranged. This gear casing 6 consists of two sections, namely, gear casing portion 239 secured to the side wall 231 of the housing 5 by means of stud bolts 241 and the gear casing portion 242 secured to the casing portion 239 by means of cap screws 243. The partition walls 234, 236, 238, side wall 231, as well as the gear casing portion 239 are provided with horizontally disposed bearings 246, 247 and 248. Rotatably mounted within the bearings 246 and 247 is a horizontally disposed shaft 251. Keyed to one end of the shaft 251 is the can turret H previously referred to, while the bean turret G is keyed to shaft 251, see Fig. 15, intermediate the partition walls 234 and 236. The other end of the shaft 251 extends into the gear casing 6 and keyed to its end is a flange 252 to which a Geneva gear 253 is adjustably secured by means of cap screws 254 extending through elongated slots 256 of the flange 252, see Fig. 25.

Freely rotatable upon the shaft 251 and interposed between the Geneva gear 253 and the side wall 231 of the housing 5, see Fig. 15, by means of a hub portion 257 is a rotary cam 258, the hub portion 257 of which is in turn rotatably received within the bearing 248 of the gear casing portion 239. Mounted upon the hub portion 257 of the rotary cam 258 and keyed thereto for rotation therewith is a gear 259 of cup-shaped configuration. The hub portion 261 of the gear 259 is positioned intermediate the bearing 248 and the Geneva gear 253.

The can turret H previously referred to consists of a body portion 271 and a circular disc 272 secured to the inner side thereof by means of a plurality of screws 273 the heads of which are countersunk in the disc 272. The body portion 271 as well as the disc 272 is provided with semi-circular can receiving pockets 274 and 276 respectively arranged in alignment with respect to each other. It should be noted, however, that the can receiving pockets 274 of the turret portion 271 are of a size corresponding to the flange diameter of the particular size of sanitary cans for which the machine is designed, while the pockets 276 of the turret portion 272 are of slightly smaller diameter and correspond to the diameter of the body portion of the respective size of sanitary can to be employed in connection with the machine.

The side wall 232, the intermediate wall 234, and the intermediate walls 236 and 238 of the housing 5 of the machine are provided with an upwardly extending portion 277 preferably formed integral therewith (see Figs. 1, 13, 14 and 17) forming spaced housing portions 278 and 279 joined at their upper ends by a rear wall 281 and top wall 282. Secured to the rear wall 281 and extending transversely of the upper portion of the housing 5 is a bean turret cover 283 of substantially semi-circular configuration which is provided with spaced reinforcing flanges 284 and 286, see Figs. 1, 13, 14 and 17. The other end of the turret cover 283 and the reinforcing flanges 284 and 286 integral therewith are secured to a supporting bracket 287 by means of cap screws 288, while the lower end of the supporting bracket 287 is attached to a downwardly extending flange 289 of the lower bean turret cover 291 by means of cap screws 292. The lower bean turret cover 291 extends between the intermediate housing walls 234 and 236 of the housing 5 and forms an integral part therewith.

Secured to the reinforcing flange 284 of the turret housing 283 above referred to is a can delivery chute 296 of any conventional structure which is adapted to deliver the sanitary cans to the pockets of the can turret H when the same are in a position as shown at 297 in Fig. 1.

The bean turret structure G, see Fig. 15, consists of a central body portion 298 and circular discs 299 and 301 secured to the sides thereof by means of screws 302, the heads of which are countersunk within the circular plates 299 and 301. The entire bean turret structure above referred to is positioned intermediate the bearings 246 and 247 of the partition walls 234 and 236 respectively, and is keyed as shown at 303 to the shaft 251 for rotation therewith. The turret portions 298, 299, and 301 are provided with a plurality of bean receiving pockets 304, see Fig. 14. These pockets are of a somewhat elongated configuration consisting of straight side walls 306 and 307 joined by a semi-circular portion 308 of a radius slightly smaller than one-half of the inside diameter of the sanitary cans to be used in connection with the machine of the present invention.

Secured to opposite sides of the bean turret cover 283 and the reinforcing flanges 284 and 286 are stationary cutting knives 311 and 312, respectively, each provided with a curved cutting edge 313 (see Figs. 1, 13, 14 and 29). The cutting knives 311 and 312 extend parallel to the circular plates 299 and 301 of the turret structure G closely spaced thereto in cutting relation therewith. The rear edges 314 of the cutting knives 311 and 312 extend toward the shaft 251 slightly beyond the lowermost edge 316 of each bean turret pocket 304, see Fig. 29. From the above arrangement of the stationary cutting knives 311 and 312 it will therefore be seen that when the pockets 304 of the bean turret structure G are filled with string beans the ends of which protrude from the sides of the turret structure G, the same will be cut off during rotation of the bean turret G while the string beans in the pockets are advanced past said stationary knives.

The ends of the string beans cut off in this manner drop into compartments 317 and 318 respectively. The compartment 317 extends downwardly and terminates in a discharge chute 319 formed by the side wall 232, the partition wall 234 and a rear and a front wall 321 and 322 connecting the same and forming an integral part therewith, see Fig. 15. In a similar manner the compartment 318 previously referred to extends downwardly within the housing 5 of the machine, terminating in a discharge chute 320 formed by the partition walls 236 and 238 and front and rear walls 323 and 324, respectively. Both of these discharge chutes are open at their lower ends and lead into a discharge belt compartment 326 extending longitudinally of the housing 5 of the machine and being open at both ends thereof adjacent the side walls 231 and 232 respectively of the housing 5. Secured to both ends of the bottom 233 of the housing 5 which is attached to the base 1 in any convenient manner, see Fig. 1, are supporting brackets 327 and 328 within which belt pulleys 331 and 332 are rotatably mounted. Trained around the belt pulleys 331 and 332 is an endless conveyor belt 333 made from rubber or any other desirable material, see Figs. 14 and 15. The arrangement being such that the upper run 334 of the endless conveyor belt 333 extends through the conveyor belt compartment 326 and is supported therein within a horizontal chute 336 extending over the entire width of the housing 5. One of the conveyor pulleys 331 and 332 is driven in any convenient manner, either by the source of power of the packing mechanism B or by an individual electric motor, not shown. The direction of travel of the conveyor belt 333 is preferably in the direction as shown by arrow 337 in Fig. 15 so that the ends of the string beans cut off by the stationary cutting knives 311 and 312 and discharged upon the conveyor belt 333 by means of the compartments or chutes 317 and 318 are discharged from the belt 333 at the free side of the packing machine so that they may be disposed of in any desired manner without interfering with any of the mechanism of the machine.

It should be further noted at this point that the can turret H and bean turret G are provided with the same number of pockets 274 and 304 respectively and are keyed to the shaft 251 in such position with respect to each other that adjacent pockets of both turrets are in alignment with each other.

The bean turret cover 283 and the reinforcing flanges 284 and 286 thereof are provided with bracket portions 341 and 342, which are preferably made integral therewith. The bracket 341 extends above the can turret structure H, see Figs. 1, 13 and 15, and is provided with spaced bearings 343 and 344 within which a can shifting and holding arm 346 is pivotally mounted by means of a pivot pin 347. The can shifting arm 346, see Figs. 13 and 15, comprises a downwardly extending portion 348 having a can engaging finger 349 consisting of a straight portion 351 and a curved portion 352 angularly disposed with respect to the same and forming a V-shaped can engaging surface 353 therewith. The can shifting arm 346 comprises further an upwardly extending portion 354 the upper end of which is pivotally secured to a rod 356 by means of a pivot pin 357. The other end of said rod is threadedly secured to a U-shaped bracket 358 while a lock nut 359 threadedly received upon a threaded portion 360 of the rod 356 and bearing against the U-shaped bracket 358 is employed for locking the respective parts in properly adjusted position with respect to each other.

The bracket 342 is provided with spaced bearing portions 361 and 362, see Figs. 13 and 17, and rotatably mounted between the same by means of a pivot pin 363, see Figs. 13, 15 and 17, is a can and bean rounding arm 364 provided with an upwardly extending portion 366 pivotally secured to the U-shaped bracket 358 by means of pivot pin 367.

Secured to the ends of the U-shaped bracket 358 adjacent the pivot pin 367 thereof are coil springs 368 and 369, the other ends of which are secured to spaced upright portions 371 and 372, respectively of a spring supporting bracket 373 secured to the upper end of the cover 242 of the gear casing 6 by means of cap screws 374.

The rear end of the arm 364 extends over the bean turret G and partially over the can turret H, i. e., the circular plate 272 of the same, and is provided with a bean rounding portion 376 above the bean turret G corresponding to the width of the same. The lower face of the bean rounding portion 376 of the arm 364 is of semi-circular cross section, as shown at 377 in Fig. 31. The radius of this semi-circular section is slightly less than one-half of the inner can diameter of the sanitary can and is adapted to cooperate with each of the pockets of the bean turret G so as to press the string beans within the pockets of the bean turret G into cylindrical packages of a diameter slightly less than the inside diameter of the can.

The rear end 378 of the arm 364 above the can turret structure H is provided at its lower side with a semi-circular recess 379, see Fig. 30, of a radius one-half the size of the outside diameter of the can. The portion 378 of the arm 364 is adapted to cooperate with the can turret in such a manner that the recess 379 thereof forms in conjunction with the pockets 276 of the circular plates 272 a circular can pocket of a size corresponding to the outside diameter of a sanitary can, so that when the arm portion 378 is moved toward the circular plate 272 of the can turret H a can of proper size resting with its lower body portion within the pocket 276 of the circular plate 272 is engaged by the can rounding portion 379 of the arm 364 upon downward movement of the rear portion 378 of the same, whereby cans which are not completely round are rounded so that they may receive a cylindrical charge of string beans from the bean turret G.

The operation of the lever arm 364 to effect its bean and can rounding operation is controlled by the rotary can 258 previously referred to. For this purpose the front end of the arm 364 is provided with a downwardly extending portion 381 carrying a cam roller 382 adapted to ride along a peripheral cam surface 383 of the cam 258, see Figs. 13 and 17. The coil springs 368 and 369 previously referred to function to hold the roller 382 in continuous engagement with the cam surface 383 of the rotary cam 258 and are adapted to retract the rear portion of the arm 364 as well as the can engaging finger 349 to inoperative position.

The configuration of the cam surface 383 of the rotary cam 258 is such that the can and bean rounding arm 364 as well as the can shifting arm 346 are operated in properly timed relation with respect to the can and bean turrets.

The can holding and shifting arm 346 functions to engage the rear end of the cans, see Fig. 15, and shift the same into such position that the flange at the open end of the can engages the circular plate 299 adjacent the pocket 304 which is at this time in alignment with the can so that the can is tightly held against the bean turret structure G for reception of a charge of beans therefrom. It should further be noted that the can and bean rounding arm is provided with an elongated annular recess 384, see Fig. 15, within which the upper flange portion at the open end of the can is received so that the same will not be damaged and a shoulder 386 adjacent the pocket 377a of the bean rounding portion of the arm 364 is formed against which the upper half of the can flange at the open end thereof is pressed. In this way the can is tightly held against the bean turret structure and the bean rounding portion of the arm 364 in proper alignment with the semi-circular faces of the respective pockets 304 of the bean turret G and the pocket 377a of the bean rounding portion of the arm 364.

Rotatably mounted within the lower portion of the housing 5 by means of bearings 401 and 402 of the side wall 232 of the housing 5 and the portion 239 of the gear casing 6, see Fig. 15, is a shaft 403 provided with a reduced portion 404 extending into the gear casing 6. Freely rotatable upon the reduced portion 404 of the shaft 403 is a gear 406 intermeshing with a drive pinion 407, keyed to a shaft 408 rotatably mounted within bearings 409 and 411, see Figs. 13 and 15, of the gear casing 6. Keyed to the rear end of the shaft 408 is a sprocket gear 412. Mounted to one side of the housing 5, see Figs. 13 and 14, in any convenient manner is an electric motor 413 provided with a speed reduction mechanism 414 having a drive shaft 416. Keyed to the drive shaft 416 is a sprocket gear 418 and trained around the same and the sprocket gear 412 previously mentioned is an endless sprocket chain 419 so that upon operation of the motor 413 the sprocket gear 412 and shaft 408 are continuously rotated causing in turn a continuous rotation of the gears 407 and 406, in the direction of the arrows 420 and 420a, respectively, see Fig. 25.

The gear 406 comprises a hub portion 421 and is provided with a female clutch member 422, see Figs. 15, 27 and 28, the inner annular surface of which comprises a plurality of notches 423 adapted to be enlarged by a dog 424 pivotally mounted by means of a pivot pin 426 on a male clutch member 428 keyed to the reduced portion 404 of the shaft 403. Mounted intermediate the body portion of the male clutch member 428 and the dog 424 is a coil spring 429 continuously urging the dog 424 in an outward direction and into engagement with one of the notches 423 previously referred to.

Keyed to a shaft 431 rotatably mounted within bearings 431a and 431b in the lower part of the cover member 242 of the gear casing 6 is a clutch control arm 432 provided with a dog engaging portion 433, see Fig. 28, having a cam surface 434 and an abutment surface 436 adapted to be engaged by an abutment member 438 rigidly secured to the male clutch member 428 and extending substantially radially therefrom.

The dog 424 is of such width that the same not only engages one of the notches 423 in the female clutch member 422 but extends also outwardly of said female member into the path of the cam portion 434 of the horizontal portion 433 of the control arm 432. When the clutch arm 432 is in its dotted line position as shown in Fig. 27, the horizontal portion 433 and the cam portion 434 thereof are in their retracted position and are held out of contact with the dog 424 which at such time is held in engagement with one of the notches 423, causing interlocking of the female and male clutch members 422 and 428, so that the rotation of the gear 406 and female clutch member 422 is transferred to the male clutch member 428 and shaft 403 causing a corresponding rotation thereof.

When the control arm 432 is moved into operative position as shown in full lines in Fig. 27, the cam portion 434 thereof extends into the path of the dog 424 so that during rotation of the male clutch member 428 the cam surface 434 will engage the dog 424 and force the same inwardly toward the shaft 404 and about its pivot point 426 against the tension of the coil spring 429, whereby the dog 424 is disengaged from the slot 423 with which it was in engagement at that time, and the driving relation between the male and female parts of the clutch is interrupted. As soon as the dog 424 has been disengaged from its driving connection with the female member 422, the abutment 438 strikes against the abutment surface 436 of the horizontal portion 433 of the control arm 432 so that further rotation of the male clutch member 428 and the shaft 403 is immediately arrested. When the control arm 432 is thereupon moved again to its inoperative or dotted line position shown in Fig. 27, the horizontal portion 433 and the cam portion 434 as well as the abutment surface 436 are retracted out of engagement with the dog 424 and abutment member 438, so that the dog 424 is released and immediately engages one of the notches 423 of the continuously rotating female clutch member 422 whereby the female and male clutch members are immediately interconnected so as to effect rotation of the shaft 403.

Keyed to the free end of the shaft 431 which extends from the gear casing 6 is a lever arm 441 pivotally secured to a movable core structure 442 of a solenoid 443 by means of a pivot pin 444, see Figs. 2, 13, 17 and 22. Secured to the movable core structure 442 of the solenoid 443 is a coil spring 446 the other end of which is attached to a bracket, not shown, secured to the housing 5 of the machine. This coil spring forces the movable core or armature 442 and the arm 441 into a position as shown in full lines in Figs. 2 and 13 when the solenoid 443 is de-energized whereby the clutch control arm 432 is moved into its full line or operative position shown in Fig. 27, causing disengagement between the co-operating clutch members 422 and 428. When the solenoid 443 is energized the armature 442 of the solenoid 443 is moved in the direction as indicated by an arrow 451 in Fig. 17, causing a corresponding movement of the arm 441 and rotation of the shaft 431, thereby effecting movement of the clutch control arm 432 from its full line to its dotted line position, whereby the driving relation between the female and male clutch members 422 and 428, is established in a manner as previously stated herein.

The de-energization of the solenoid 443 is controlled by certain mechanism of the machine which will be described later on.

Keyed to the shaft 403 intermediate the bearing 402 and the gear 406 is a gear 456, see Fig. 15, which intermeshes with a gear 457 keyed to the hub portion 458 of a Geneva driver 459 which in turn is keyed to a shaft 461 rotatably mounted within bearings 462 and 463 of the housing portions 239 and 242 of the gear casing 6. This Geneva driver 459, a detail of which is shown in Fig. 26, includes a drive pin 464 provided with a rotatable sleeve 467. The Geneva driver 459 is further provided with a locking flange 468, see also Fig. 25, which is adapted to cooperate with curved faces 469 of the Geneva gear 253 previously referred to. The Geneva gear 253 is further provided with six radially extending slots 471 equally spaced with respect to each other and adapted to be engaged and disengaged by the rotatable sleeve 467 of the drive pin 464 of the Geneva driver 459 so that upon one revolution of the Geneva driver 459 one-sixth of a revolution of the Geneva gear 253 is effected, causing a similar revolution of the shaft 251 and the bean turret G as well as the can turret H each of which are provided with six bean receiving and can receiving pockets, respectively. In other words, the number of pockets of the bean and can turrets correspond to the number of radial slots of the Geneva gear 253.

Pivotally mounted within bearings 471 and 472 of web portions 473 and 474 respectively, see Figs. 15 and 16, extending between the side wall 231 and the intermediate wall 238, by means of a pivot pin 476 is a plunger actuating lever 477 the lower end 478 of which is provided with a cam roller 479 adapted to travel within a rotary cam track 481 of a rotary cam 482, see Fig. 16. The cam roller 479 is rotatably mounted on the lower end 478 of the plunger actuating lever 477 by means of a pivot pin 483 provided with a head 484 and a retaining nut 485.

The upper end of the plunger actuating lever 477 terminates in a yoke-like structure 486 having spaced arms 487 and 488, each one of which is provided with an elongated slot 489, see Figs. 13, 15 and 17, which is open at its upper end and adapted to receive a pin 491 extending transversely through a plunger shaft 492 and a collar 493 secured to the plunger shaft 492 within the yoke structure 486 by means of said pin 491. The collar 493 is provided with a downwardly extending portion 494 which extends into a slot 496 within the upper portion of the plunger control lever 477 whereby rotation of the collar 493 and the plunger shaft 492 with respect to the plunger control lever 477 is prevented.

The plunger shaft 492, see Fig. 15, is slidably supported within bearings 501 and 502 which are a part of upwardly extending brackets 503 and 504, respectively, of the bearing member 247 previously referred to.

One end of the plunger shaft 492 is provided with a plunger member 506 rigidly secured thereto in any convenient manner. This plunger 506, see Fig. 14, is of circular configuration of a diameter slightly less than the diameter of the semi-circular portion of the pockets of the bean turret and the inside diameter of the can to be filled. The plunger shaft 492 and plunger 506 are arranged in such position that they are in alignment with the pockets of the bean and can turrets when the same are adjacent the bean rounding and can rounding portion of the arm 364 as shown at 507 in Fig. 14.

The plunger shaft 492 is freely slidable within the bearings 501 and 502 so that the shaft may be reciprocated back and forth into operative and inoperative positions to effect the discharge of the string beans from the pockets of the bean turret into the cans at the proper moment in the cycle of operation of the machine. The reciprocation of the plunger shaft 492 is effected by the plunger control lever 477 which in turn is operated by the rotary cam 482 and cam roller 497 upon rotation of the shaft 403 and the rotary cam 482. The configuration of the circular cam track 481 of the rotary cam 482 is such that a proper operation of the plunger 506 as referred to in the above is obtained during the operation of the machine.

Pivotally mounted within bearings 521 and 522 which are integral parts of the side wall 231 and partition wall 234 respectively of the housing 5, see Fig. 17, is a control shaft 523, see Figs. 1, 2, 16, 17 and 18. Keyed to the rear end of the shaft 523 is a pressure control arm structure 524 which comprises vertically extending bean engaging arms 526 and 527. The pressure control arm structure is positioned on shaft 523 in such a manner that the arms 526 and 527 extend upwardly into the bean turret structure, i. e., into the spaces 528 and 529 intermediate the turret body 298 and the circular plates 299 and 301 respectively. In other words the arm 526 extends into the space 528 while the arm 527 extends into space 529 of the bean turret structure G in such a manner that the upper end of each arm is slightly above the pockets 304 when the same are in a horizontal position as shown at 531 in Fig. 14. The lower portion of the pressure control arm structure 524 is further provided with an arm 532 provided with a cam roller 533 rotatably mounted to the free end of said arm in any convenient manner, see Figs. 14, 18 and 20. The cam roller 533 is adapted to cooperate with the peripheral cam surface 534 of a rotary cam 536 keyed to the shaft 403 for rotation therewith, see Figs. 1, 14 and 20. The peripheral cam surface 534 of the rotary cam 536 is provided with a hill portion 537 and a valley portion 538 of such configuration as to effect a proper operation of the shaft 523, the pressure control arm structure and other parts associated therewith in properly timed relation with respect to the operation of the remaining parts of the machine, as will be specifically pointed out later on.

Keyed to the shaft 523 adjacent the bearing 521 is a switch control lever 541 the free end of which is adapted to engage a set screw 542 threadedly secured to the free end 543 of a switch supporting bracket 544, see Fig. 16, pivotally mounted at its other end by means of a pivot pin 546 to the side wall 231 of the housing 5. The switch supporting bracket 544 is free to tilt under its own weight about the pivot pin 546 in a downward direction when the switch control lever 541 is moved in downward direction, i. e., in a direction indicated by arrow 547 in Fig. 16. The upward movement of the switch control arm 541, i. e., its movement in a direction opposite to arrow 547, is limited by an adjustable set screw 548 threadedly secured to a supporting rib 549 extending in a horizontal direction from the web 473 previously referred to herein.

Secured to the switch control arm 541 and extending therefrom in an opposite direction is a rod 551 upon which a pressure control weight 552 is adjustably secured by means of a lock screw 553. Secured to the switch bracket 544 by means of metal clips 556 and 557 is a mercury switch 558, see Figs. 16 and 32 which consists of a glass body 559 within which spaced contacts 561 and 562 are arranged and which contains a pool of mercury 563. The spaced ends of the contacts 561 and 562 are located adjacent the end 543 of the switch bracket 544 so that when the switch bracket 544 is tilted in a downward direction about its pivot 546 the mercury will close the contacts 561 and 562.

The electric motors 101 and 413 of the feed and packing mechanisms of the machine are connected to a source of electric energy 564 by means of wires 571, 572, and 573, 574 respectively, see Fig. 32. A main switch 576 located in a junction box 577 secured to the motor 413, see Fig. 16, is provided for starting and stopping the operation of the machine. The switch contact 561 of the mercury switch 558 is connected to wire 573 by means of a wire 578 while the switch contact 562 is connected by means of a wire 579 to one end of the coil 581 of the solenoid 443 previously referred to. The other end of the coil 581 of the solenoid 443 is connected by means of a wire 582 to the wire 574, see Fig. 32. From the above it will therefore be seen that when the contacts 561 and 562 of the mercury switch 558 are closed by means of the mercury 563 the solenoid 443 is energized while opening of the mercury switch 558 causes de-energization of the solenoid 443.

The housing portions 278 and 279 previously referred to are provided with bearings 591, 592 and 593, 594 respectively, see Figs. 13, 14 and 17. Slidably arranged within the bearings 591 and 592 is a guide rod 596 while another guide rod 597 is slidably arranged within the bearings 593 and 594.

Fixed to each guide rod 596 and 597 in any convenient manner is a collar 598, see Figs. 14 and 17, and surrounding the guide rod 596 and interposed between the collar 598 and the bearing 591 is a coil spring 599. A similar coil spring 601 surrounding the guide rod 597 is interposed between the collar 598 fixed to the guide rod 597 and the bearing 593 so that the guide rods 596 and 597 are normally held in their lowermost position, as shown in Figs. 14 and 17.

Secured to the lower ends of the guide rods 596 and 597 is the bean dividing and unlacing mechanism K, see Figs. 14, 17 and 19 to 23 inclusive, which consists of a housing structure 602 provided with sockets 603 and 604 within which the lower ends of the rods 596 and 597 are received and fixed thereto by means of set screws 606 and 607 respectively. The housing 602 is provided with a downwardly extending arm portion 608 terminating in spaced bearings 609 and 611 intermediate of which a cam roller 612 is rotatably mounted by means of a pin 613. The cam roller 612 cooperates with the peripheral cam surface 534 of the rotary cam 536 previously referred to. The housing 602 of the bean dividing and unlacing mechanism K is further provided with a cover plate 616 secured thereto by means of screws 617, see Figs. 14 and 22. The cover plate 616 is further provided with an upwardly extending bean dividing finger 618 of semi-circular cross section. This finger is welded to the cover plate 616 so that it forms an integral part therewith.

Rotatably mounted within bearings 621 and 622 of the housing 602 and cover plate 616 respectively by means of a shaft 623 is a gear segment 624, see Figs. 21 and 23, arranged in intermeshing relation with a gear segment 626, keyed to the upper end of an actuating shaft 627 rotatably mounted within a tubular bearing 628 forming in integral part of the housing 602 previously referred to and extending downwardly therefrom. Keyed to the lower end of the actuating shaft 627 is an actuating arm 629 which carries a freely rotatable cam roller 631, see Figs. 17, 20 and 24.

Surrounding the tubular bearing 628 is a coil spring 632 the upper end of which is fixed to the bearing 628 by means of a pin 633, see Figs. 17 and 19. The lower free end of the coil spring 632 engages an extension 634 of the actuating arm 629, which in turn is fixed to the shaft 627, see Figs. 21 and 24. The coil spring 632, secured with one end to the bearing 628 and engaging with the other end thereof the extension 634 of the arm 629, is sufficiently tensioned so as to urge the cam roller 631 into engagement with the cam face 636 of a horizontally extending cam portion 637 of the rotary cam 536 which is keyed to the shaft 403.

Extending upwardly from the gear segments 624 and 626 are bean dividing and unlacing fingers 638 and 639 respectively. These fingers are welded to their respective gear segments so that they form an integral structure therewith. Each of the fingers 638 and 639 forms a quadrant of a circle in cross section, as will be best seen from Fig. 20. When the gear segments 624 and 626 are in a position as shown in Fig. 23 the inner side faces of all three fingers 618, 638 and 639 contact each other and form an expansible finger structure of circular cross section which is tapered and terminates in blunt point at the upper end thereof, see Fig. 14.

The coil spring 632 normally holds the fingers 638 and 639 in closed position and in contact with the finger 618. When the fingers 638 and 639 are closed the arm 629 and roller 631 are in a position as shown in Fig. 17 so that the roller 631 extend into the path of the cam portion 637 when the bean dividing and unlacing mechanism K is in its uppermost position as shown in Fig. 19. The spring 632 maintains the roller 631 in operative engagement with the cam face 636 during rotation of the cam 536 and engagement of the face 636 with the roller 631.

Normally all three fingers 618, 638 and 639 are in contact with each other as shown in Fig. 14. However, upon rotation of the rotary cam 536 and while the bean dividing and unlacing mechanism K is in its uppermost position the cam face 636 thereof engages the roller 631 rotating the arm 629 and shaft 627 against the tension of the spring 632 from the position shown in Fig. 17 to the position shown in Fig. 19. This causes rotation of the gear segments 624 and 626 in opposite directions as indicated by arrows in Fig. 23, whereby the fingers 638 and 639 secured to the gear segments are moved away from each other and the finger 618 in diverging arcuate paths, see Fig. 22. This movement of the bean dividing and unlacing fingers 638 and 639 is caused by engagement of the cam roller 631 with the valley portion 641 and hill portion 642 of the cam surface 636 of the rotary cam 536 upon rotation of the latter, see Fig. 19. While subsequently during travel of the roller 631 along the valley portion 643 of the cam face 636, the fingers 638 and 639 are returned to their original position and into contact with the finger 618 under the action of the coil spring 632.

From Figs. 17 and 20, it will be noted that the cam surface 636 of the rotary cams 536 is of substantially semi-circular configuration, i. e., it does not extend all the way around the rotary cam 536. Therefore, upon disengagement of the cam roller 631 from the cam surface 636, the bean dividing and unlacing fingers remain in their closed position. It should further be observed that the hill portion 642 of the cam portion 636 of the rotary cam 536 extends a considerable distance along the side of the rotary cam 536 so that during travel of the cam roller 631 along the hill portion 642 the bean dividing and unlacing fingers 638 and 639 remain in their open position, as shown in Fig. 21, for a considerable time during the operation of the machine.

During the rotation of the rotary cam 536 in the direction of arrow 644, see Figs. 14 and 21, the entire bean dividing and unlacing mechanism K is raised and subsequently lowered upon engagement of the roller 612 with the hill portion 537 and valley portion 538 respectively. The hill portion 537 as well as the valley portion 538 are of considerable extent so that the bean dividing and unlacing mechanism will remain in its uppermost or lowermost position for a considerable time during the operation of the machine.

When the bean dividing and unlacing mechanism is in its lowermost position the bean dividing and unlacing fingers thereof are closed and remain closed during the upward movement of said mechanism. However, as soon as the bean dividing and unlacing mechanism K has reached its uppermost position, the bean dividing and unlacing fingers 638 and 639 are opened and are subsequently closed before the downward movement of the bean dividing and unlacing mechanism K begins.

The bean feeding mechanism A and the bean packing mechanism B are so arranged with respect to each other that the rear ends of the plates 111 and 112 are closely spaced with respect to the bean turret G and that the feed chute F is in horizontal and vertical alignment with the pockets 304 of the bean turret G when the same are in a position as shown at 531 in Fig. 11, so that the string beans arranged within the feed chute F are fed directly into the pockets 304 of the bean turret G.

The rear ends of the oscillating feed chute plates 111 and 112 are provided with slots of V-like configuration, the apex of said slots being positioned at 646 and 648, while the widest portion of said slots is located at the rear end of plates 111 and 112. This is necessary to prevent any interference between the bean dividing and unlacing fingers and the plates 111 and 112 during the operation of the machine.

*Operation of bean packing mechanism*

In describing the operation of the bean packing mechanism, it is assumed that one of the pockets 304 of the bean turret G designated 671 is in the position indicated at 531 in Fig. 14, that both motors 101 and 413 are in operation, that the entire mechanism of the packing mechanism is at rest with the exception of the continuously rotating gear 406, and the bean chute F is filled with string beans in a manner as previously described herein. At this stage in the operation of the machine the pressure control arms 526 and 527 are in their forward position, see Fig. 14, and the bean dividing and unlacing mechanism K is in its lowermost position as shown in said figure.

Due to the action of the feed chute F as previously described herein the string beans are fed in a continuous stream into the pocket 671 thereby engaging the pressure control arms 526 and 527 and forcing the same backwardly in the direction of the arrow 672 in Fig. 14 against the action of the pressure control weight 552, whereby the control shaft 523 is rotated causing in turn a downward movement of the switch control arm 541, in the direction of arrow 547, see Fig. 16, whereby a downward tilting of the switch bracket 544 and the mercury switch 558 is effected.

The amount of pressure necessary to effect the backward movement of the pressure control arms 526 and 527 depends upon the position of the pressure control weight 552 on the rod 551. The position of this pressure control weight on the rod 551 is adjustable so that it may be set into any desired position according to the tightness of packing of the string beans required.

The degree of tilt of the switch bracket 544 and mercury switch 558 during a certain amount of downward travel of the switch control arm 541 is dependent upon the position of the set screw 542. This set screw may be so adjusted that the mercury switch 558 will close at any desired point during the backward movement of the pressure control arms 526 and 527.

In other words the set screw 542 may be so adjusted that the mercury switch will close during a partial backward movement of the pressure control arms 526 and 527 or may close when the pressure control arms are at their rearmost position as shown in Fig. 20. The amount of beans fed into the pocket 671 depends entirely upon the position of the pressure control arms 526 and 527 at the time of the closing of the mercury switch. Consequently the adjustment of the set screw 542 determines the amount of string beans admitted to the pocket 671.

As soon as the mercury switch 558 is closed in a manner as above described the solenoid 443 is energized, causing movement of the armature 442 thereof in a direction as indicated by arrow 451 in Fig. 17, whereby shaft 431 is rotated in the direction of arrow 431c, see Fig. 27, effecting movement of the clutch control lever 432 from its full line or operative position to its dotted line or inoperative position, as shown in this figure, releasing the dog 424 pivotally mounted on the male member 428. The spring 429 forces the dog 424 outwardly so that the same engages one of the notches 423 of the continuously rotating female clutch member 422 which forms an integral part with the continuously rotating gear 406. This causes immediate establishment of driving relation between the clutch members 422 and 428 in turn effecting a rotation of the shaft 403, the gear 456 and cams 482 and 536 in the direction as indicated in Figs. 16, 17 and 25. The shaft 403, as well as the gear 456 and cams 482 and 536, perform only one complete revolution at a time as will be more clearly seen later on.

During the rotation of the cam 536, which engages roller 612, the bean dividing mechanism is raised and the fingers 618, 638 and 639 which are at this time in closed position are forced upwardly through the mass of beans within the feed chute F adjacent the bean turret G. All of these fingers are at such time adjacent the apex of the V-slots 646 and 648 of the upper and lower plates 111 and 112 respectively of the feed chute F. The rotary cam 536 which also engages the roller 533 of the pressure control arms 526 and 527 moves the same to their rearmost position provided that the beans entering the bean turret pocket 671 have not already forced said levers to their rearmost position which would be the case when the set screw 542 is adjusted to trip the mercury switch 558 when the pressure control arms reach their rearmost position. Thereupon the rotary cam 536 retains the bean dividing and unlacing mechanism K in its uppermost position and the pressure control arms 526 and 527 in their rearmost position until they are released as referred to later on herein. The maintenance of the pressure control arms 526 and 527 in their rearmost position as above described is merely a safety measure to prevent premature opening of the mercury switch 558. However, usually no damage will result when this precaution is not taken and the machine will properly operate even though the mercury switch is tripped at a premature time in the operation thereof.

Shortly before the bean dividing mechanism K reaches its uppermost position the roller 631 is engaged by the cam portion 537 of the rotary cam 536 during the rotation of the same, whereby a rotation of shaft 627 and gear segment 626 in the direction of arrow 673, see Fig. 23, is effected. Due to the intermeshing relationship of the gear segment 626 with the gear segment 624 the latter is likewise rotated in a direction as indicated by arrow 674 in Fig. 23. The rotation of the gear segments in the manner above referred to causes a backward and outward movement of the bean dividing and unlacing fingers 638 and 639 from the position shown in Fig. 23 to a position as shown in Figs. 20, 21 and 22. The finger 618, however, remains in its position as shown in Fig. 20, holding the oncoming mass of beans back in the feed chute F so that no additional string beans are permitted to enter through the discharge end of the feed chute F into the pocket 671 of the bean turret G. While the bean dividing finger 618 retains the mass of oncoming beans in the feed chute F and the bean dividing and unlacing fingers 638 and 639 move in a rearward direction as illustrated in Fig. 20 the string beans positioned intermediate the bean dividing fingers and the pocket 671 of the bean turret G are divided from the remaining mass of beans in the feed chute F and are gently forced into the bean receiving pocket 671 so that a predetermined charge of beans is packed into the pocket 671 in a manner as shown in Fig. 20. In view of the backward and outward movement of the bean dividing and unlacing fingers 638 and 639 as best seen from Figs. 21 and 22, an unlacing action is performed by said fingers whereby interlaced string beans are gently unlaced at the point of division of the charge of beans 676 from the remaining mass of beans designated 677 in Fig. 20.

As above stated the rearward movement of the bean dividing and unlacing fingers 638 and 639 forces the charge of beans separated from the remaining mass within the feed chute F into the pocket 671 of the bean turret G and it should be noted that the bean dividing and unlacing fingers 638 and 639 move into such proximity with respect to the bean turret G that the charge of beans is completely received within the pocket 671 and does not protrude therefrom.

While the bean dividing and unlacing mechanism K remains in its uppermost position with the bean dividing and unlacing fingers in open position, as shown in Fig. 20, the Geneva drive pin 464 enters the radial slot 678, see Fig. 25, of the Geneva gear 253 and causes one-sixth of a revolution of said gear, shaft 251, bean turret G and can turret H.

The Geneva drive pin 464 forms a part of the Generva driver 459 which is rotated by means of the gear 457 and gear 456 previously referred to.

In rotating the bean turret G in a manner as above described the pocket 671 is moved from position 531 to position 679, see Fig. 14. During the movement of the bean turret pocket 671 from position 531 to position 679, i. e., when the turret is half way between these two positions and the turret pocket 671 has just been closed by the turret housing 283, the bean dividing fingers 638 and 639 begin to close under the action of spring 632 when the roller 631 leaves the hill portion 636 of the rotary cam 536, and are closed when the roller 631 disengages from the valley portion 643 during further rotation of the cam 536.

As soon as the dividing fingers are completely closed the roller 612 enters the valley portion 538 of cam 536 and the bean dividing and unlacing mechanism K is returned to its lowermost position as shown in Fig. 14, under the action of the coil springs 599 and 601, rotary cam 536 and roller 612 cooperating therewith. Incident to the downward movement of the bean dividing and unlacing mechanism K the pressure control arms 526 and 527 are returned to their forward or original position as show in Fig. 14, under the action of the counterweight 552 while the roller 533 enters the valley portion 538 of the rotary cam 536.

When the bean dividing and unlacing mechanism K and the pressure control arms 526 and 527 are in their positions as shown in Fig. 14 the advancement of the turret pocket 671 from position 531 to position 679 is completed, the Geneva drive pin 464 has left the slot 678 which is now in a position as shown at 681 in Fig. 25, and any further rotation of the Geneva gear 253, shaft 251, bean turret G and can turret H is arrested because during the continuing rotation of the Geneva driver 459 the flange 468 thereof engages the curved face 682 of the Geneva gear 253 and locks Geneva gear 253, shaft 251, bean turret G and can turret H against further rotation.

While the pocket 671 of the bean turret G is advanced from position 531 to position 679, see Fig. 14, with the free ends of the beans projecting from both sides of said pocket the cutting knives 311 and 312 adjacent both sides of the bean turret G cut off the protruding ends of a portion of the charge of beans within the pockets 671 while the protruding ends of the beans of the remaining portion of the charge within the pockets 671 are subsequently cut off during the next step of rotation of the bean turret G when pocket 671 is advanced from position 679 to position 686. This subsequent rotation of the bean turret above referred to during which the pocket 671 is advanced from position 679 to position 686 in Fig. 14 will be specifically described later on and is only referred to at this time for the purpose of describing the complete cutting operation of the knives 311 and 312.

The free ends of the beans protruding from the bean pocket 671 which are cut off by the knives 311 and 312 in a manner above referred to drop into the bean discharge chutes 319 and 320 previously referred to which discharge the same upon the upper run of the conveyor belt 333 which is driven in the direction shown by arrow 337 in Fig. 15 in any desired manner (not shown).

While the pressure control arms 526 and 527 return to their original position as shown in Fig. 14 under the action of the counterweight 552 the switch control arm 541 returns to its uppermost position as shown in Fig. 16, thereby returning the switch bracket 444 to its horizontal or original position as illustrated in this figure. This opens the mercury switch 558 and interrupts the current supply to the solenoid 443, whereby the same is de-energized and the armature 442 thereof is now returned to its original position, as shown in Fig. 17, under the action of the coil spring 446. This causes movement of the clutch control arm 432 from its dotted line or inoperative position to its operative or full line position as shown in Fig. 27. While the clutch control arm 432 is now maintained in this position and the rotation of the female and male clutch members 422 and 428 as well as shaft 403 and its associated parts continues the dog 424 strikes against the cam face 434 of the horizontal portion 433 of the control arm 432 whereby the dog 424 is disengaged from the respective notch 423 of the female member 422 with which it is in engagement at this time. The disengagement of the dog 424 above referred to interrupts the driving connection between the clutch members 422 and 428 and immediately after such disengagement of the clutch members the abutment member 438 carried by the male clutch member 428 abuts against the abutment surface 436 of the clutch control arm 432 whereby further rotation of the male clutch member 428 and shaft 403 is immediately arrested causing cessation of the rotation of the gear 456 and rotary cams 482 and 536, so that the entire operating mechanism of the packing mechanism with the exception of gear 406, drive pinion 407, shaft 408, and sprocket gear 412 is at rest.

While the pocket 671 of the bean turret G is in the position as indicated at 679 in Fig. 14, a sanitary can is supplied from the can chute 296 to the pocket designated 687, see Figs. 1 and 15, adjacent the pocket 671 and in proper alignment therewith. The can is supplied in such a manner to the pocket 687 of the can turret H that the open end thereof faces the bean turret plate 299. While the can turret H and the bean turret G are moved into the position last referred to the bean turret pocket designated 688 is now in the position 531 previously occupied by the pocket 671. In other words, the pocket 668 is now in alignment with the feed chute F and a charge of string beans is received therein in the same manner as previously referred to in regard to the pocket 671. The pressure control arms 526 and 527 are again moved in a backward direction by the charge of string beans entering the pocket 688 whereby another closing action of the mercury switch 558 is effected and another cycle of operation of the machine is initiated, which is carried out in the same manner as the first cycle of operation of the machine referred to herein.

When the filling of the pockets 688 is completed the Geneva gear 253 is advanced another step, i. e., performs one-sixth of a revolution in a similar manner as previously referred to whereby the bean turret G and can turret H are again rotated until the pocket 671 is now in a position as shown at 686 in Fig. 14 while the pocket 688 is in a position as shown at 679. When the pocket 671 has reached the position 686 and while the rotation of the shaft 403 continues during this cycle of the operation of the machine, the rotary cam 258 causes a pivotal movement of the bean and can rounding arm 364 about its pivot 363 as well as a pivotal movement of the can shifting arm 346 about its pivot 347. The can shifting arm 346, as well as the bean and can rounding arm 364, which are normally held in a position as shown in dotted lines in Fig. 15 by means of the coil springs 368 and 369 when the roller 382 is disengaged from the rotary cam 258 are now swung into a position as shown in full lines in Fig. 15.

During the movement of the can shifting arm 346 from its dotted line to its full line position the can engaging finger 351 thereof engages the rear end of the can resting within the can pocket 687 which is now in a position as shown at 689 in Fig. 15 adjacent and in alignment with the bean turret pocket 671 positioned at 686 as above described, and shifts the can toward the bean turret G. Incident to the operation of the can shifting arm 346 the bean and can rounding arm 364 moves from its dotted line to its full line position as shown in Fig. 15. The bean rounding portion 377 enters the pocket 271 now in position 686 and compresses the charge of string beans in said pocket into cylindrical configuration, see Fig. 14. At the same time the can rounding portion 378 engages the can and rounds the same in case the body portion thereof should not be perfectly round. The action of the bean and can rounding arm 364 and the shifting of the can toward the bean turret G by means of the can shafting arm 346 is performed simultaneously and at the ends of the operation of both arms the can is in a position as shown in Fig. 15 with the flange at the open end of the can resting against the side face of the plate 299 and the shoulder 386 of the can rounding portion 376 of the can and bean rounding arm 364.

As soon as the can is in a position as above described and while the arms 364 and 346 are now held in their full line position as shown in Fig. 15 by the action of cam 258 and roller 382 the continued rotation of the shaft 403 and cam 482 causes reciprocation of the plunger control arm 477 which in turn effects reciprocation of the plunger shaft 492 and the plunger 506 carried thereby which at this time is in alignment with the pocket 671 of the bean turret at its position indicated at 686 in Fig. 14. The plunger 506 enters the pocket 671 and shifts the cylindrical charge of string beans which had been cut to predetermined length by means of knives 311 and 312, in a manner as previously referred to herein, from the bean turret pocket 671 into the can J and is subsequently immediately retracted to its original position as shown in full lines in Fig. 15.

In the meantime the filling of the pocket 688 and the operation of the bean dividing and unlacing mechanism K in conjunction therewith has been completed and another operation of the Geneva gear 253 is now effected in the same manner as previously referred to herein whereby the shaft 251 and the bean turret G, as well as the can turret H, are rotated a predetermined distance so that the pockets 671 and 687 of the bean turret G and the can turret H respectively are now in a position as indicated at 691 in Fig. 1, in which the can turret pocket 687 is adjacent the discharge chute 692 which receives the filled can and discharges the same from the machine. While only the complete cycle of operation of the machine with respect to one bean and can turret pocket during their travel from filling to discharge position has been described, it is to be understood that the cycle of operation of the machine repeats with respect to each succeeding pocket of the bean turret G and can turret H in the same manner as set forth in the above with respect to the pockets 671 and 687.

I claim:

1. A machine for handling string beans comprising orienting means for arranging the bean pods of a promiscuous mass of string beans side by side in substantially parallel relation, bean compressing means cooperating therewith for receiving and maintaining the arranged pods in said relation and for compacting them into a continuous mass, and means associated with the compressing means for dividing said mass into separate packs.

2. A machine for handling string beans comprising a hopper for receiving a promiscuous mass of string beans, orienting means associated with said hopper for arranging bean pods of said mass side by side in substantially parallel relation, means cooperating therewith for compressing the arranged pods in such relation into a compact continuous mass, and means for dividing said mass into separate packs.

3. A machine for handling string beans comprising means for positioning the bean pods of a promiscuous mass of string beans side by side in substantially parallel relation, means cooperating with said first named means for receiving and maintaining the pods in said relation and for compacting the pods sidewise into a continuous procession, means cooperating with said compacting means for dividing said procession into separate packs, and means for cutting said packs to uniform length.

4. A machine for packing string beans comprising means for arranging the individual bean pods of a mass of string beans in side by side relation, means associated therewith for receiving the pods and for assembling and compressing them in said relation into a continuously progressing mass, and means cooperating with said compressing means for separating said mass into batches and for packaging the same.

5. A machine for handling string beans comprising means for arranging the individual beans of a mass of string beans side by side in substantially parallel relation, means for receiving and compressing the arranged beans in said relation into a continuous stream, means associated with the compressing means for dividing the stream of beans therein into separate batches, and means for receiving said batches under compression from said compressing means including means for cutting and compressing said batches to uniform size.

6. A machine for packing string beans comprising means for orienting the individual string beans of a promiscuous mass thereof side by side in substantially parallel relation, means for collecting the oriented beans in such relation from said orienting means and for compressing them into a continuous stream, means for receiving said stream, means intermediate said compressing and receiving means for interrupting the stream of beans into said receiving means to admit a predetermined charge of beans thereto, means for cutting said charge to predetermined size in said receiving means, means for compressing the charges therein, and means for ejecting said compressed charge from said receiving means into a container.

7. A machine for handling string beans comprising a rotatable hopper adapted to receive a promiscuous mass of string beans therein and having pockets for receiving and isolating beans from said mass and for arranging the isolated beans in predetermined relation, a turret having bean receiving pockets, means interposed between said hopper and turret for receiving and compacting the beans in said predetermined relation and for feeding them from the hopper into the pockets of said turret, and means cooperating with said feed means and turret for controlling the admission of the beans in substantially equal charges into the pockets of said turret.

8. A machine for handling string beans comprising a rotatable hopper for receiving a promiscuous mass of string beans, said hopper including pockets for receiving and separating beans from said mass and for arranging them in predetermined relation, a turret having bean receiving pockets, feed means for receiving the arranged beans from the pockets of said hopper in said relation and for compressing and feeding the beans in said predetermined relation into the pockets of said turret, means cooperating with said feed means for controlling the admission of the beans into the pockets of the turret, means associated with the turret for cutting the beans received within the pockets of the turret to uniform length, and means cooperating with the turret for compressing the beans in the pockets of the turret into charges of predetermined size.

9. A machine for handling string beans comprising a rotatable hopper for receiving a promiscuous mass of string beans, said hopper having pockets for receiving and isolating beans from said mass and for arranging them in predetermined relation, a turret having bean receiving pockets, feed means between said hopper and turret, means for crowding the arranged beans from said hopper into said feed means and for compressing them therein, means for operating said feed means for feeding the compressed beans in a continuous stream toward said turret and into the pockets thereof, means between said turret and feed means for dividing the stream of beans into equal charges and for depositing said charges into said turret pockets, and means associated with said turret for controlling the admission of the beans into the pockets of the turret and for controlling the operation of said bean dividing means.

10. A machine for handling string beans comprising a rotatable hopper adapted to receive a promiscuous mass of string beans and having pockets for receiving and separating string beans from said mass and for arranging them side by side in substantially parallel relation, a turret having bean receiving pockets, means for receiving the beans in said relation from the hopper for compressing them into a continuous mass and for advancing said mass toward the pockets of the turret, means cooperating with said compressing means and turret for controlling the admission of the beans in substantially equal charges into the pockets of the turret, and means for discharging the charges of beans from the pockets of the turret.

11. In a machine for handling string beans, a feed chute, a continuously rotating feed turret for feeding string beans side by side in substantially parallel relation into said chute and for continuously crowding said beans thereinto in said relation into a continuously progressing mass, an intermittently rotating bean turret having pockets for receiving portions of the mass of beans from said chute, means for controlling the admission of portions of the mass of beans from said chute to the pockets, means for compressing the portions in said pockets into cylindrical charges, means for cutting said charges in said pockets to uniform length, and means for discharging said charges from the pockets into containers.

12. In a machine for handling string beans, means for orienting the individual beans of a promiscuous mass thereof in side by side relation and with one of their ends lying in a common plane, means for receiving the beans in said relation from the orienting means and for maintaining and compressing the beans in said relation into a continuous mass, said compressing means including cooperating opposing movable plates forming a passage for said mass therebetween, and means for oscillating said plates for compacting and advancing said mass therebetween.

13. In a machine for handling string beans, means for orienting the individual beans of a promiscuous mass thereof in side by side relation and with one of their ends lying in a common plane, means cooperating with the orienting means for receiving the beans therefrom in said relation and for assembling them in said relation into a continuous mass including cooperating movable plates, means for oscillating said plates for compacting said mass of beans and for advancing the same along said plates, and means cooperating with said plates for dividing said continuous mass of beans into separate batches.

14. In a string bean handling machine, means for receiving a promiscuous mass of string beans and for arranging and compressing them in juxtaposed relation in a continuous procession, a turret having a plurality of bean receiving pockets for receiving batches of beans from said arranging means and for conveying them to a place for subsequent packing thereof, and means cooperating with said arranging means and turret for dividing said procession of beans into separate batches and for depositing said batches into the pockets of said turret.

15. A string bean handling machine, comprising means for receiving a promiscuous mass of string beans and for arranging and compressing them in juxtaposed relation in a continuous procession, a turret having a plurality of bean receiving pockets for receiving batches of beans from said arranging means and for conveying them to a place for subsequent packing thereof, means cooperating with said arranging means and turret for dividing said procession of beans into separate batches and for depositing said batches into the pockets of said turret, and means for operating said turret and bean dividing means in timed relation with respect to each other.

16. A dividing mechanism for string bean handling machines, comprising three dividing fingers normally positioned adjacent each other, means for thrusting said fingers into a mass of string beans advanced along a support, and means for moving two of said fingers in diverging paths away from the remaining finger transversely and longitudinally of said mass while said fingers extend through said mass for dividing said mass into separate parts.

17. A bean dividing and unlacing mechanism for string bean handling machines comprising a plurality of fingers normally positioned side by side in contact with each other, means for entering and extending said fingers in said relation through a mass of juxtaposed string beans advanced along a support with said fingers angularly disposed to the pods of said mass, and means for moving two of said fingers in diverging arcuate paths away from the remaining finger to divide said mass into separate parts and to unlace beans interlacing said parts.

18. A dividing mechanism for string bean handling machines comprising a divided prong consisting of a plurality of fingers, means for thrusting said prong through a stream of beans advanced along a support with the pods lying transverse to their advance, and means for separating said fingers from each other longitudinally and laterally of the stream to divide and unlace a charge of beans from the stream.

19. In a machine for handling string beans, a bean compressing mechanism for compressing string beans side by side into a continuously progressing mass including a bean assembly chute for maintaining said mass compressed and for conveying it to a place for subsequent packing thereof, a bean dividing unit movable into and out of said chute, said unit comprising a plurality of laterally movable fingers and a finger fixed against lateral movement, means for moving said unit into said chute and for thrusting it through said mass transversely of the beans thereof, and means for moving said movable fingers in diverging paths away from said fixed finger transversely and longitudinally of said mass to separate a portion from said mass, to unlace the beans at the zone of separation and to discharge said portion from said chute.

20. A machine for packing string beans comprising means for arranging the individual beans of a mass of string beans side by side in substantially parallel relation, means for receiving and compressing the arranged beans in said relation into a continuously progressing mass, bean packaging means associated with said compressing means, means for dividing said mass into separate batches and for forcing them into said packaging means, means cooperating with the packaging means for compressing the batches of beans into cylindrical charges of predetermined size, means for cutting said cylindrical charges to predetermined length, and means for depositing said charges into containers.

21. A machine for packing string beans into containers comprising means for arranging the individual beans of a promiscuous mass of string beans in predetermined order, means for collecting the arranged beans from said first named means in said order and for compacting them into a continuously progressing mass, means cooperating with said compacting means for dividing said mass into separate packs, and means for receiving said packs from said compacting means and for depositing said packs into containers.

22. A machine for packing string beans comprising means for arranging the individual beans of a promiscuous mass of string means side by side in substantially parallel relation, means for receiving and compacting the positioned beans in said relation into a continuously progressing mass, means cooperating with said compacting means for dividing said mass into separate batches, means for receiving said batches from the compacting means and for compressing said batches into packs of predetermined size, and means associated with the receiving means for discharging said packs therefrom and for depositing said packs into containers.

23. A machine for packing string beans comprising means for arranging the individual beans of a mass of string beans side by side in substantially parallel relation, means for receiving said beans from the arranging means and for compacting the arranged beans in said relation into a continuously progressing mass, bean packaging means associated with said compacting means, means associated with the compacting means for dividing said mass into separate batches and for forcing them into said packaging means, means cooperating with said packaging means for compressing the batches of beans into cylindrical charges of predetermined size, and means for discharging the charges of beans from the packaging means into containers.

24. A machine for handling string beans comprising an obliquely disposed rotary hopper for receiving a promiscuous mass of string beans, orienting means associated with said hopper for arranging the individual beans of said mass side by side in substantially parallel relation and for discharging them in said relation from said hopper, a bean compacting mechanism provided with substantially parallel plates forming a chute, a rotary turret intermediate said hopper and chute for receiving the oriented beans from said hopper and for crowding them in said oriented relation into said chute, and means for oscillating said plates in synchronism and for moving them toward and away from each other whereby the beans crowded into said chute are compacted therein and are advanced along the same in a continuous mass.

25. A machine for handling string beans comprising a rotatable hopper adapted to receive a promiscuous mass of string beans and having pockets for receiving and separating string beans from said mass and for arranging them side by side in substantially parallel relation, a turret having bean receiving pockets, means for receiving the beans in said relation from the hopper for compressing them into a continuous mass and for advancing said mass toward the pockets of the turret, and means cooperating with said compressing means and turret for controlling the admission of the beans in substantially equal charges into the pockets of the turret.

26. A bean dividing mechanism for string bean handling machines comprising a support, a finger fixed on said support, a plurality of fingers movably arranged on said support and normally disposed side by side in abutting relation with said fixed finger, means for moving said support to introduce said finger in abutting relation as a unit into a mass of string beans advanced along a support, and means for moving the movable fingers away from each other and said fixed finger transversely and longitudinally of said mass for dividing the mass of beans into separate portions.

27. A bean dividing mechanism for string bean handling machines comprising a holder provided with a finger fixed thereto and a plurality of fingers movably mounted thereon, said fixed and movable fingers being normally disposed side by side in parallel and abutting relation, means for actuating said holder to effect entry of said fingers in abutting relation into a mass of string beans advanced along a support with the individual string beans disposed transversely to the direction of travel of the mass, and means for moving the movable fingers away from the fixed finger in diverting paths in the general direction of travel of said mass to thereby divide said mass into separate portions.

28. A mechanism for dividing string beans advanced in a continuous mass along a support with the individual beans disposed transversely to the direction of travel of said mass, comprising a plurality of dividing fingers arranged side by side in abutting relation, means for inserting said fingers in said relation as a unit into said mass, and means associated with said inserting means for effecting movement of two of said fingers in diverging paths in the general direction of travel of said mass while retaining the remaining finger at the point of insertion of the fingers into said mass to thereby separate a portion of said mass from the remainder thereof.

29. A mechanism for dividing string beans advanced in a continuous mass along a support with the individual beans disposed transversely to the direction of travel of said mass, comprising a plurality of dividing fingers arranged side by side in abutting relation, means for inserting said fingers in said relation as a unit into said mass at right angles to the individual beans thereof, and means associated with said inserting means for effecting movement of two of said fingers in diverging arcuate paths in the general direction of travel of said mass while retaining the remaining finger at the point of insertion of said fingers into said mass to thereby separate a portion of said mass from the remainder thereof and to unlace the beans of the separated portion from the remainder of the mass.

30. A mechanism for dividing string beans advanced in a continuous mass along a support with the individual bean pods disposed transversely to the direction of travel of said mass, comprising a multiple prong unit, means for thrusting said unit into the mass of string beans at right angles into the individual pods of said mass, and means for moving some of the prongs of said unit in diverging paths from the remaining prong of said unit and in the general direction of travel of said mass while said unit is disposed in said mass to thereby separate a portion of said mass from the remainder thereof and to unlace bean pods interlaced at the zone of division.

31. In a machine for handling string beans, a feed chute, a feed turret for feeding beans side by side in substantially parallel relation into said chute and for crowding the beans therein into a continuously progressing mass, a bean turret having pockets for receiving portions of the mass of beans from said chute in said crowded relation, means for intermittently rotating the bean turret for successively aligning the pockets of the bean turret with said chute, means for admitting predetermined portions of said mass from said chute to the pockets of the bean turret, means for compressing said portions in said into cylindrical charges, means for cutting said charges to uniform length upon rotation of the turret, and means operable in timed relation with the bean turret for discharging said charges from said pockets into containers.

ALBERT R. THOMPSON.

REFERENCES CITED

The following references are of record in the file of this patent:

UNITED STATES PATENTS

| Number | Name | Date |
|---|---|---|
| 822,218 | Mueller | May 24, 1906 |
| 1,193,935 | Saurth et al. | Aug. 8, 1916 |
| 1,230,227 | Salter | June 19, 1917 |
| 1,276,375 | Killingworth | Aug. 20, 1918 |
| 1,314,300 | Alvey | Aug. 26, 1919 |
| 1,358,725 | Gaynor | Nov. 16, 1920 |
| 1,432,899 | Probst | Oct. 24, 1922 |
| 1,454,555 | Neilsen | May 8, 1923 |
| 1,485,099 | Wahl | Feb. 26, 1924 |
| 1,577,762 | Schaanning | Mar. 23, 1926 |
| 1,701,641 | Skriba | Feb. 12, 1929 |
| 1,794,743 | Urschel | Mar. 3, 1931 |
| 1,860,491 | Burtchaell | May 31, 1932 |
| 1,866,027 | Gill | July 5, 1932 |
| 1,870,533 | Scott et al. | Aug. 9, 1932 |
| 1,899,179 | Bentel et al. | Feb. 28, 1933 |
| 1,964,084 | Rundell | June 26, 1934 |
| 1,971,870 | Molins | Aug. 28, 1934 |
| 1,993,197 | Urschel | Mar. 5, 1935 |
| 2,016,820 | Milmore | Oct. 8, 1935 |
| 2,037,124 | Jacobs et al. | Apr. 21, 1936 |
| 2,048,156 | Gardner | July 21, 1936 |
| 2,123,780 | Howard | July 12, 1938 |
| 2,180,349 | De Back | Nov. 21, 1939 |
| 2,190,936 | De Back | Feb. 20, 1940 |
| 2,195,882 | Christiansen | Apr. 2, 1940 |
| 2,235,890 | Bower et al. | Apr. 1, 1941 |
| 2,252,845 | Gantzer | Aug. 19, 1941 |

Certificate of Correction

Patent No. 2,467,278.  April 12, 1949.

ALBERT R. THOMPSON

It is hereby certified that errors appear in the printed specification of the above numbered patent requiring correction as follows:

Column 5, line 52, for the word "other" read *outer*; column 7, lines 35 and 36, for "extensions 118 and 118" read *extensions 118 and 119*; column 15, line 32, for "enlarged" read *engaged*; column 32, line 32, claim 31, before "portions" insert *pockets*;

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*